(12) United States Patent
Ramsland

(10) Patent No.: US 9,194,366 B2
(45) Date of Patent: *Nov. 24, 2015

(54) HORIZONTAL AXIS WIND TURBINE WITH BALL-AND-SOCKET HUB

(71) Applicant: Arnold Ramsland, Chatham, NJ (US)

(72) Inventor: Arnold Ramsland, Chatham, NJ (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/941,542

(22) Filed: Jul. 15, 2013

(65) Prior Publication Data

US 2013/0330188 A1  Dec. 12, 2013

Related U.S. Application Data

(63) Continuation-in-part of application No. 13/137,458, filed on Aug. 17, 2011, now Pat. No. 8,708,654.

(51) Int. Cl.
*F03D 1/06* (2006.01)
*F03D 7/02* (2006.01)
*F03D 11/00* (2006.01)

(52) U.S. Cl.
CPC ............ *F03D 1/0691* (2013.01); *F03D 1/0658* (2013.01); *F03D 7/0224* (2013.01); *F03D 11/0008* (2013.01); *F05B 2240/50* (2013.01); *F05B 2250/43* (2013.01); *Y02E 10/721* (2013.01); *Y02E 10/722* (2013.01)

(58) Field of Classification Search
None
See application file for complete search history.

(56) References Cited

U.S. PATENT DOCUMENTS

| 756,616 | A | * | 4/1904 | Fornander | 416/9 |
| 2,050,764 | A | * | 8/1936 | Rogers | 416/135 |
| 2,105,315 | A | * | 1/1938 | Finch | 416/247 R |

(Continued)

FOREIGN PATENT DOCUMENTS

| CN | 202228267 U | 5/2012 |
| SU | 1550209 A1 | 3/1990 |
| UA | 76785 C2 | 11/2005 |

OTHER PUBLICATIONS

International Search Report for International Application No. PCT/US2013/026691 (Form PCT/ISA/210), mailed Oct. 31, 2013, 1 page.

(Continued)

*Primary Examiner* — Christopher Verdier
*Assistant Examiner* — Justin Seabe
(74) *Attorney, Agent, or Firm* — Withrow & Terranova, P.L.L.C.; Vincent K. Gustafson

(57) ABSTRACT

A horizontal axis wind turbine with a ball-and-socket hub is disclosed. The hub enables horizontal axis turbines with two or more blades to teeter in response to wind shear gradients. The new hub design for a turbine equipped with three blades has been modeled using modified FAST code and has shown significant advantages over present three-bladed turbines with fixed hubs in reducing loads on the blades, tower, main shaft and bearings. The new hub design for a turbine equipped with three blades has also shown significant advantages over present two-bladed teetering turbines in reducing loads on the blades and tower. A likely additional advantage of a ball-and-socket hub equipped with three blades over a teetering hub with two blades is that wider teetering ranges are possible due to the significantly reduced likelihood for resonant teetering.

22 Claims, 40 Drawing Sheets

(56) References Cited

U.S. PATENT DOCUMENTS

| | | | |
|---|---|---|---|
| 4,068,131 A * | 1/1978 | Jacobs et al. | 290/55 |
| 6,923,615 B2 * | 8/2005 | Crinion | 415/4.1 |
| 8,246,302 B2 * | 8/2012 | Bertolotti | 416/1 |
| 8,398,369 B2 * | 3/2013 | Rebsdorf et al. | 416/43 |
| 8,708,654 B2 | 4/2014 | Ramsland | |
| 2006/0159550 A1 * | 7/2006 | Nagao | 416/132 B |
| 2008/0304969 A1 * | 12/2008 | Fu | 416/148 |
| 2011/0142627 A1 | 6/2011 | Perkinson | |
| 2012/0070286 A1 | 3/2012 | Carter | |
| 2012/0070304 A1 | 3/2012 | Nielsen et al. | |
| 2012/0099993 A1 | 4/2012 | Guerenbourg et al. | |

OTHER PUBLICATIONS

Jonkman, J.; Buhl, M.; FAST User's Guide, Technical Report NREL/EL-500-38230, Oct. 2005, National Renewable Energy Laboratory, Golden, Colorado.

Jonkman, J.; Dynamics Modeling and Loads Analysis of an Offshore Floating Wind Turbine, Technical Report NREL/TP-500-41958, Nov. 2007, National Renewable Energy Laboratory, Golden, Colorado.

Jonkman, B.; Buhl Jr., M. L.; TurbSim User's Guide, Technical Report NREL/TP-500-39797, Sep. 2008, National Renewable Energy Laboratory, Golden, Colorado.

\* cited by examiner

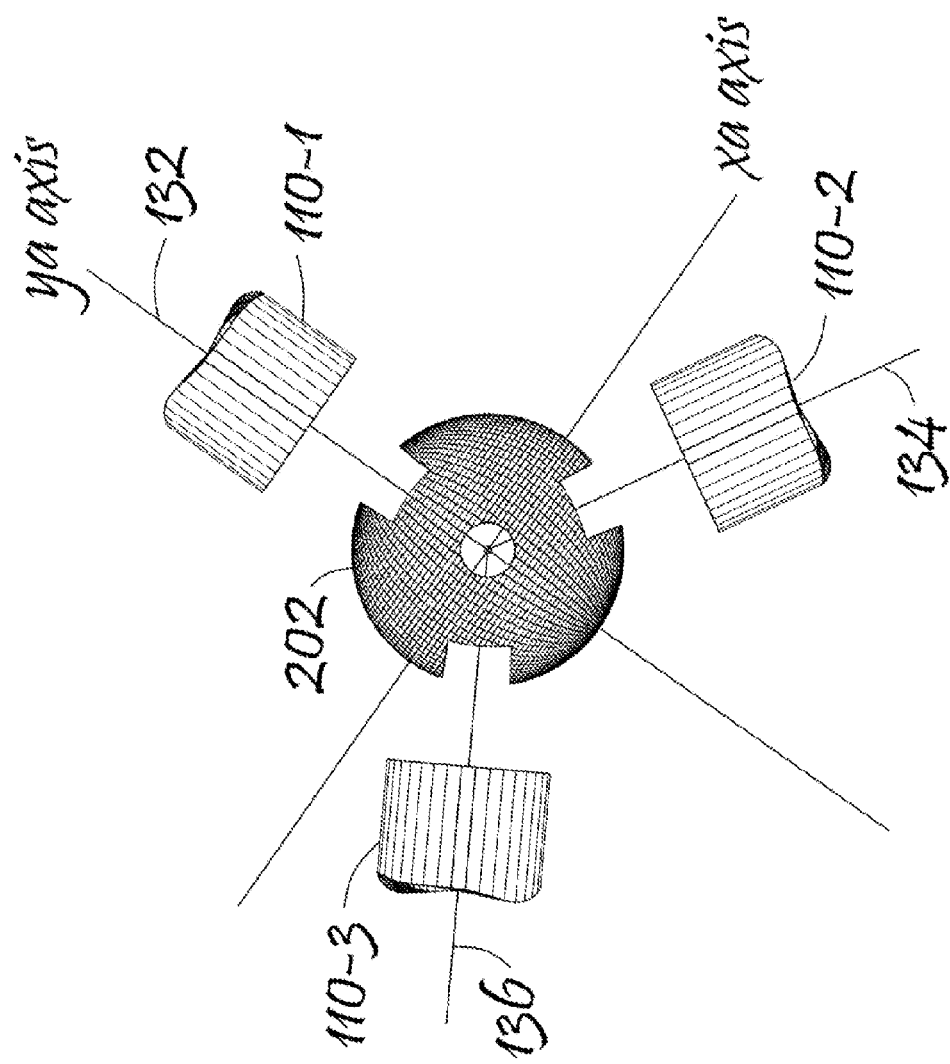

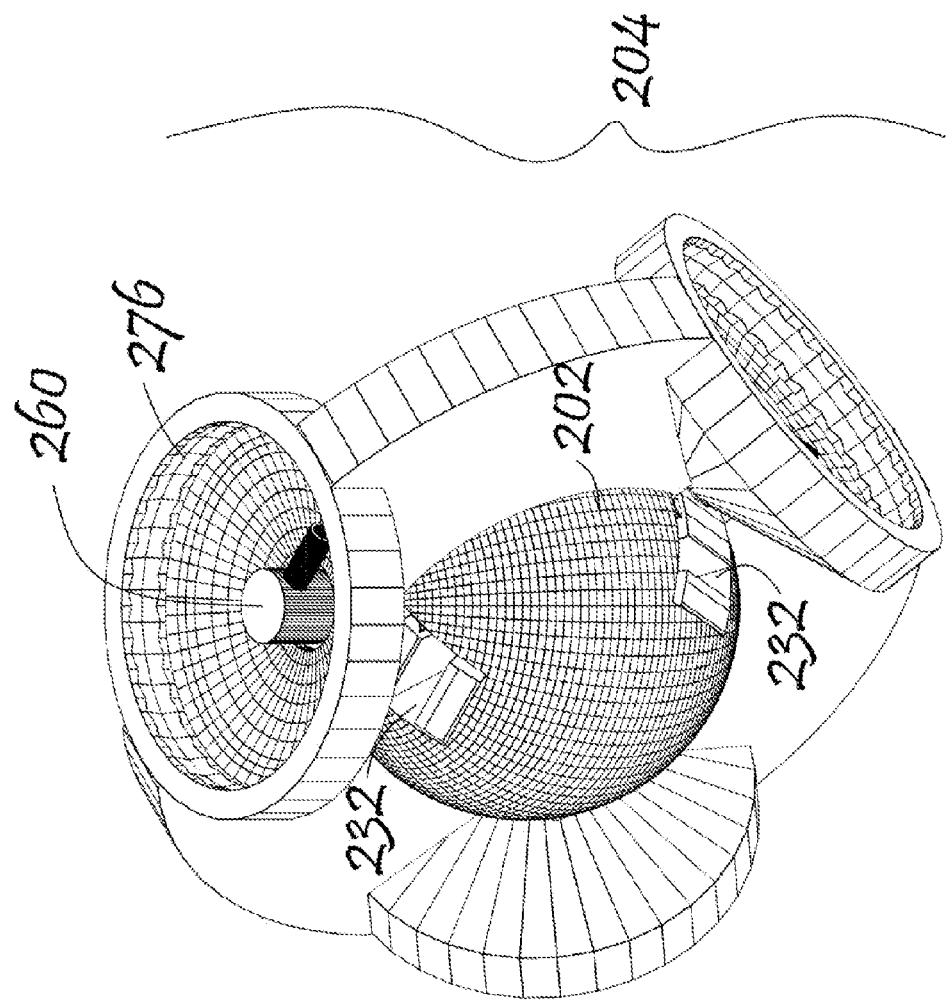

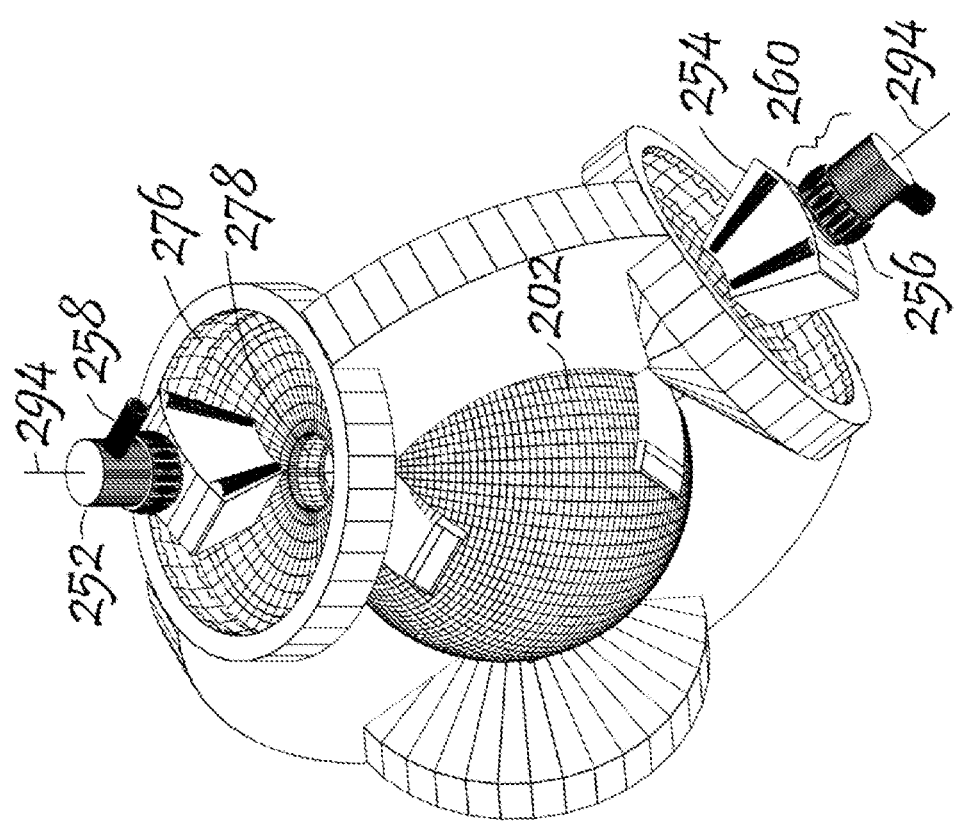

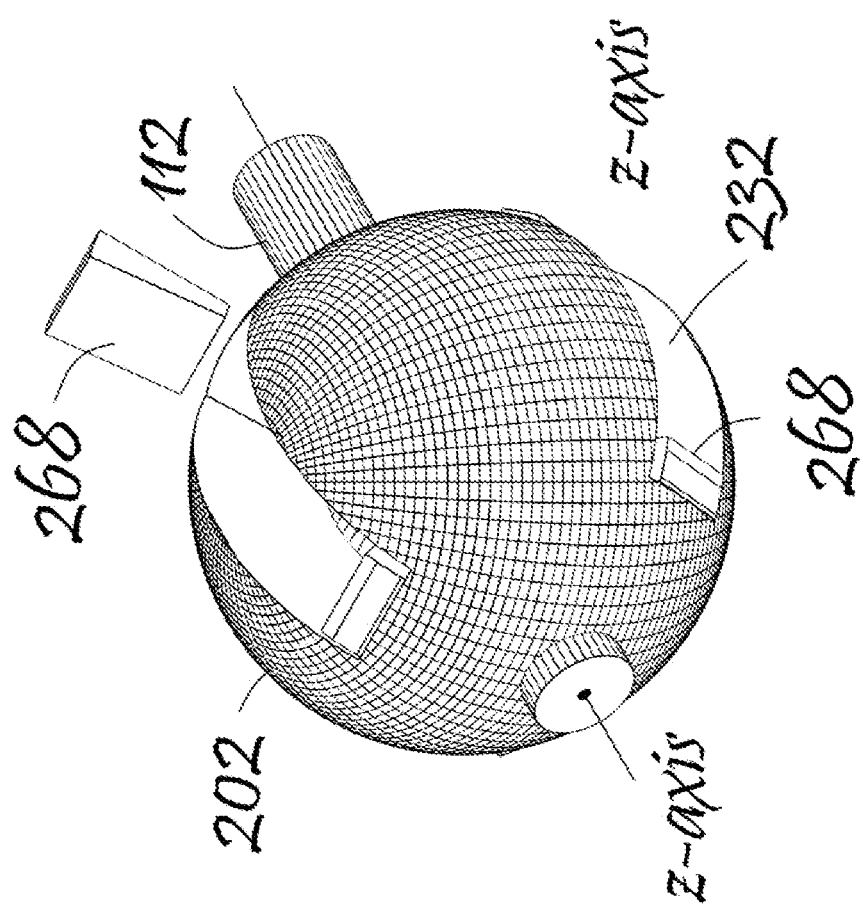

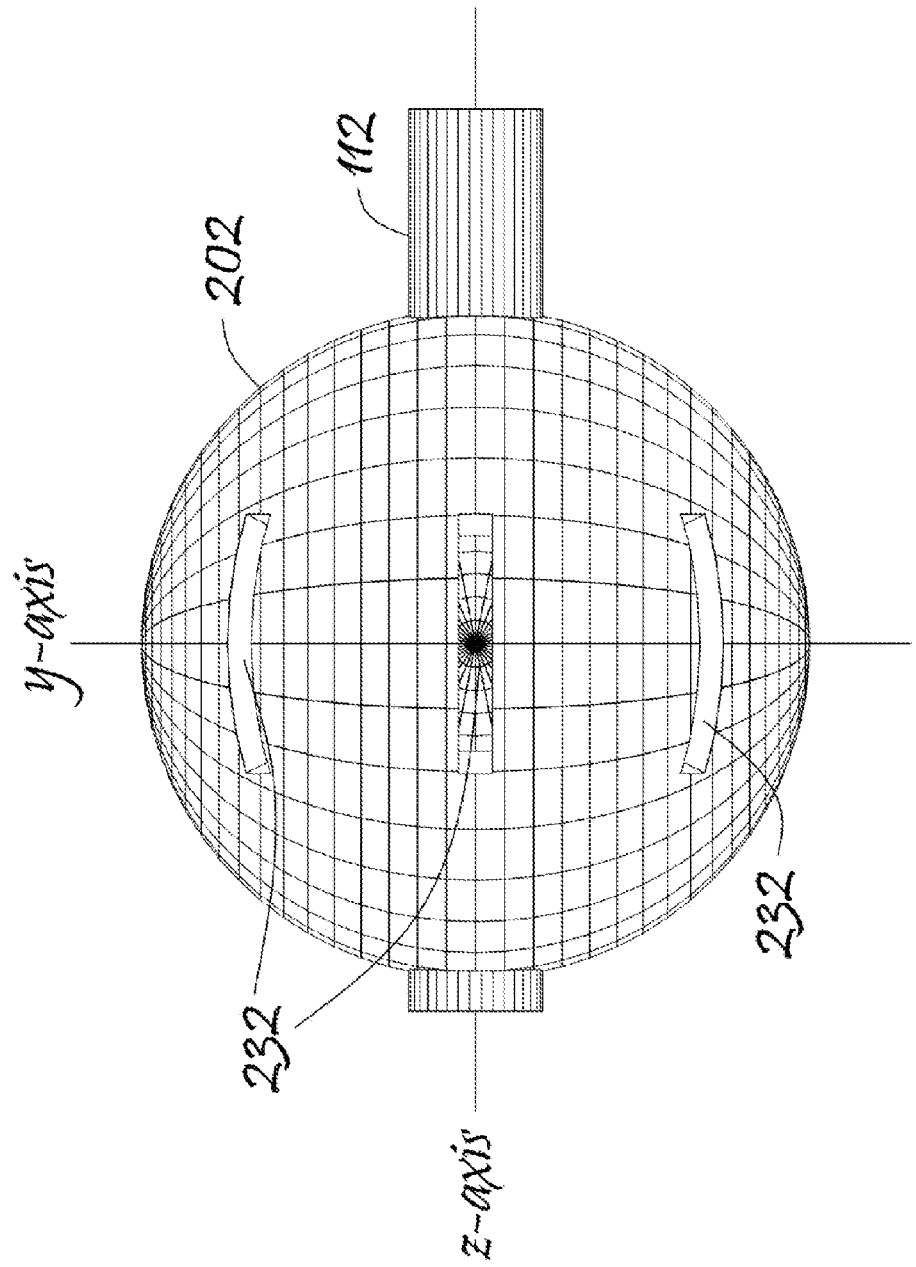

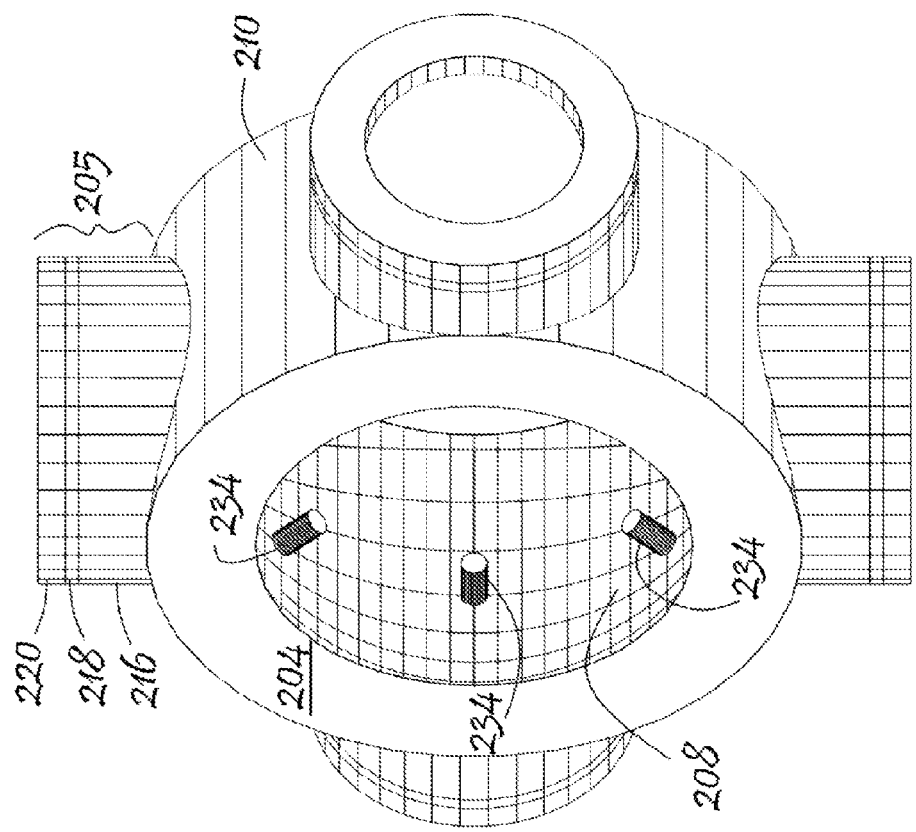

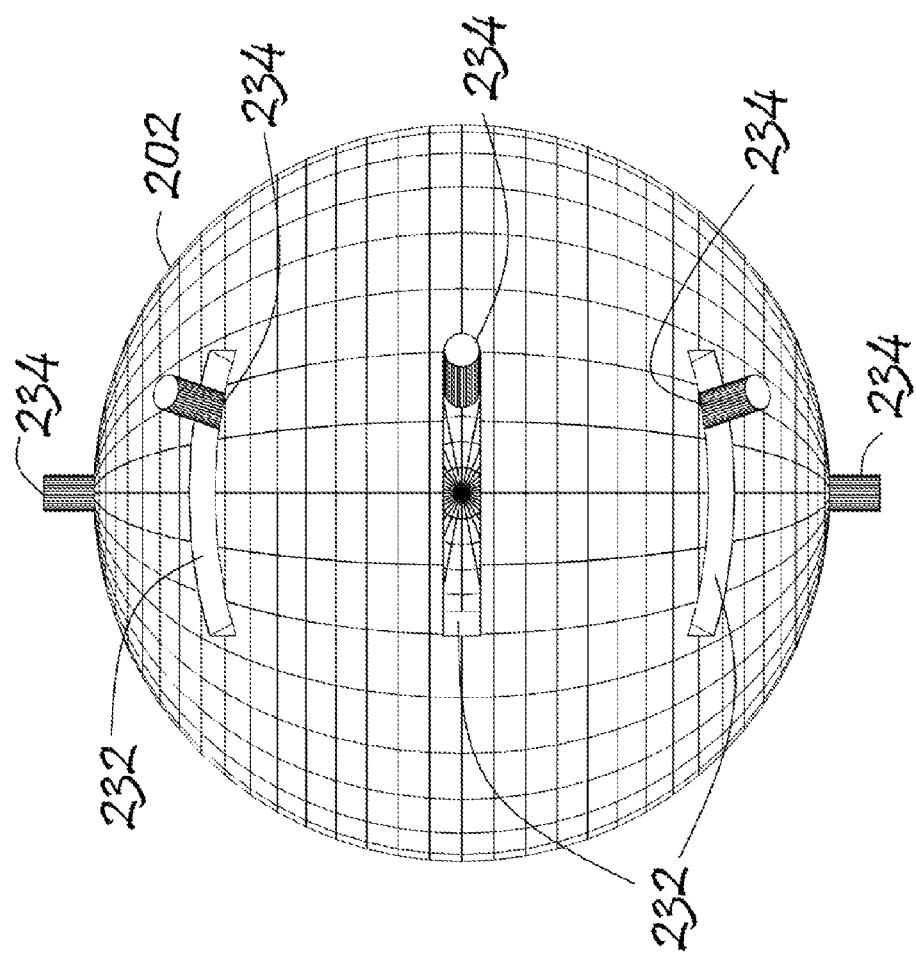

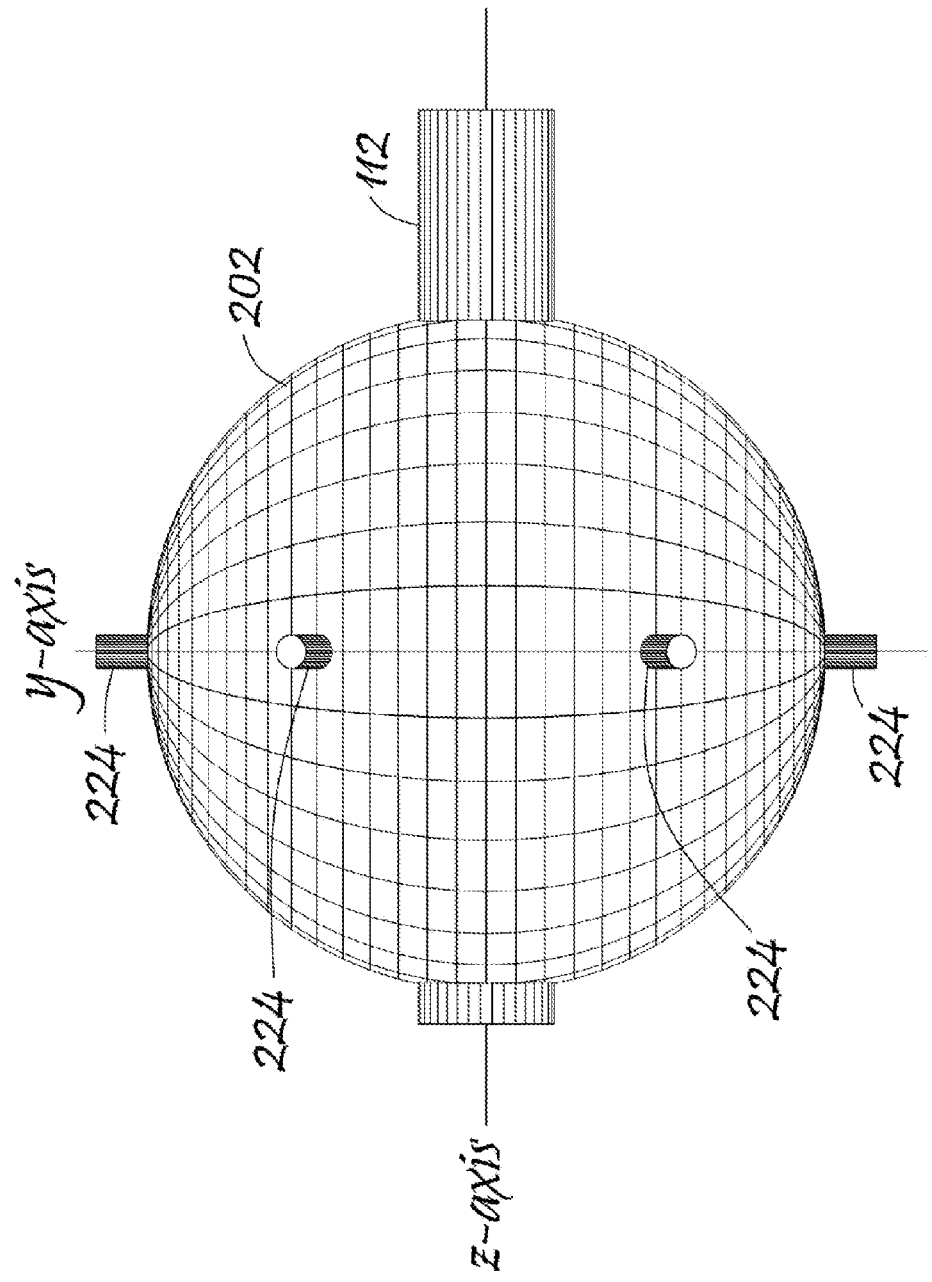

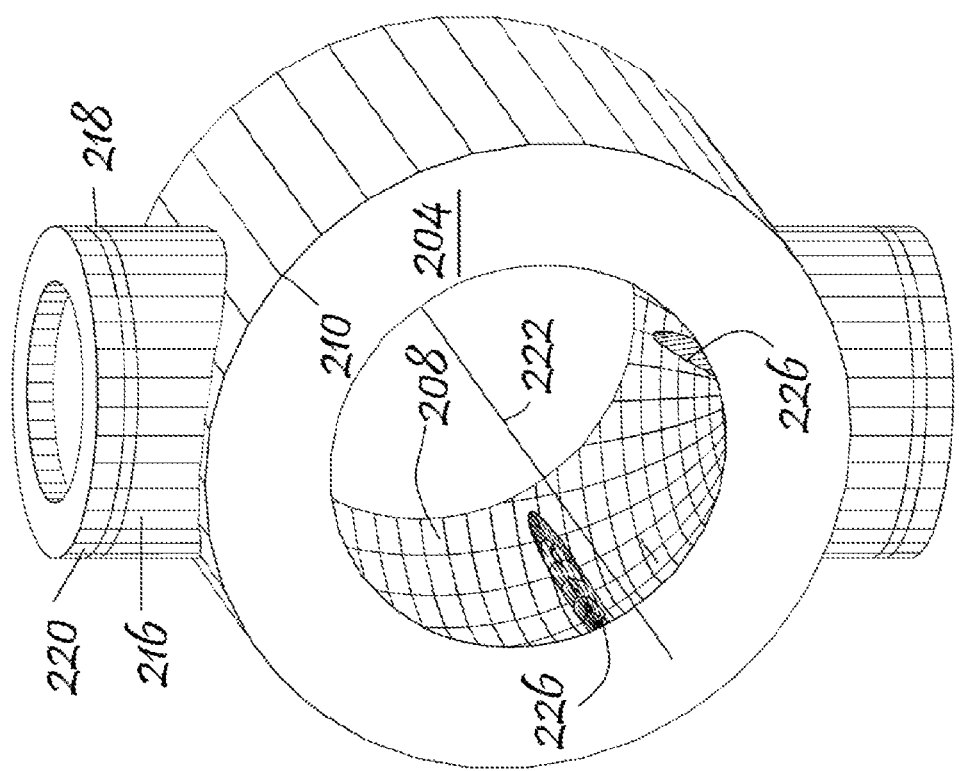

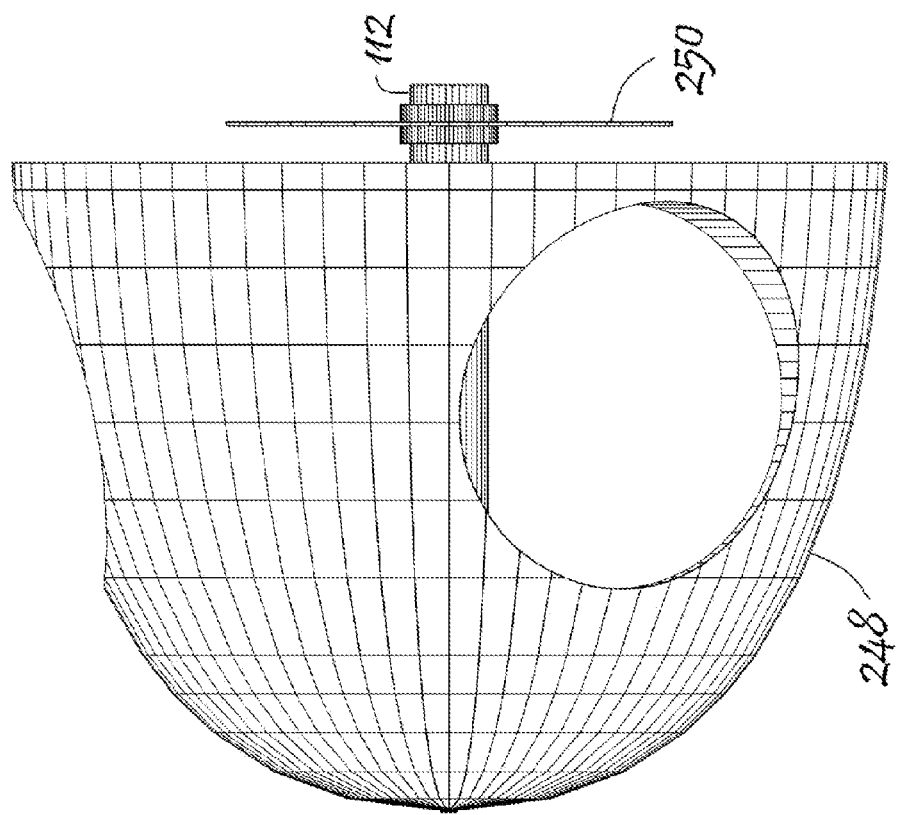

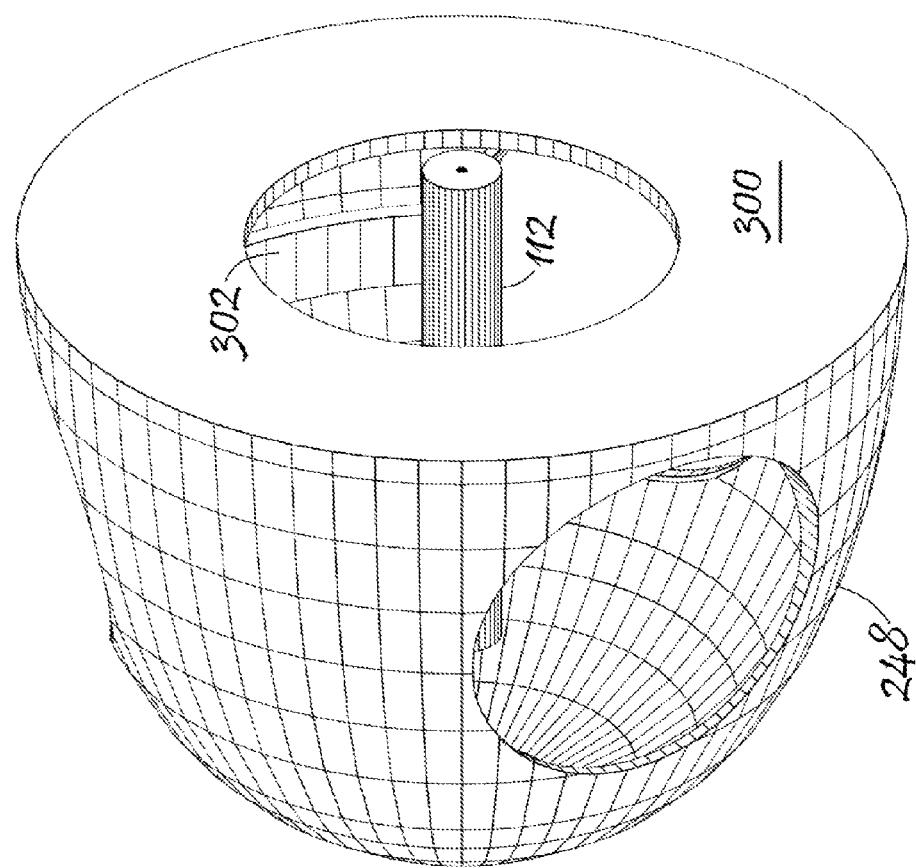

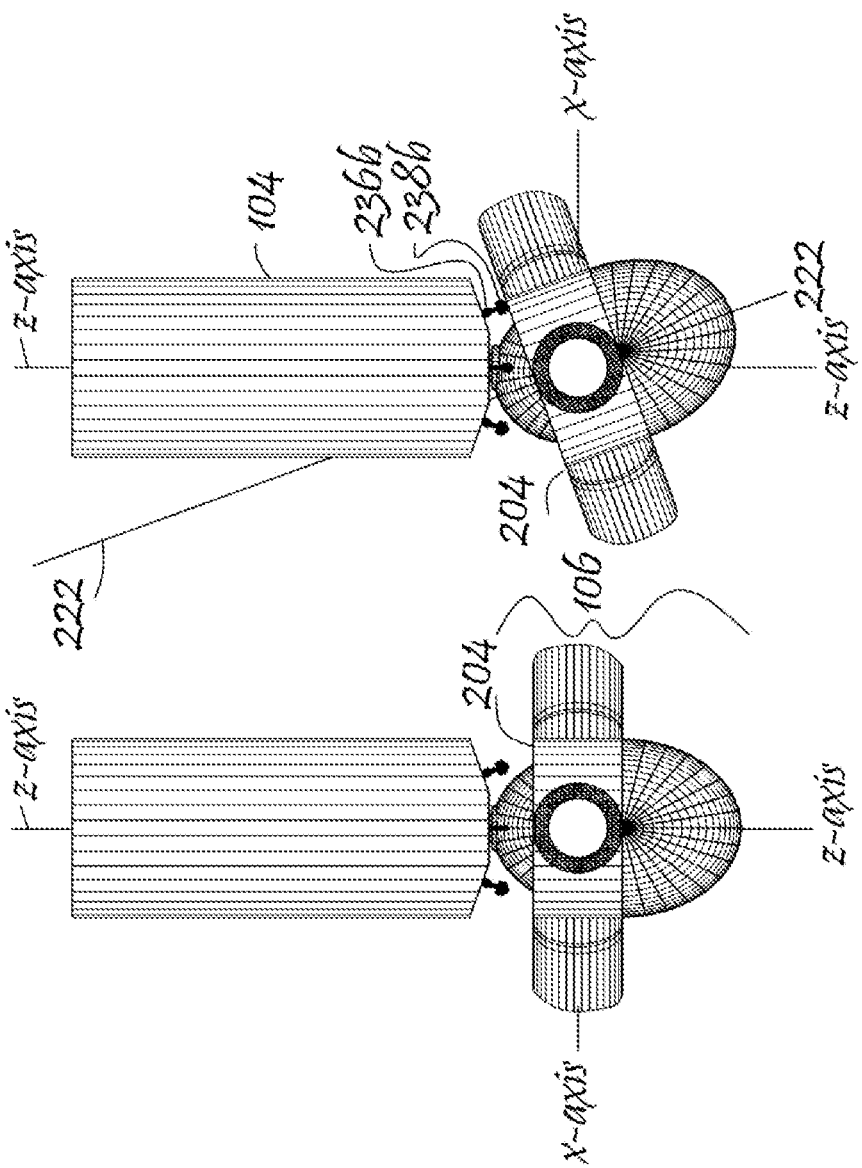

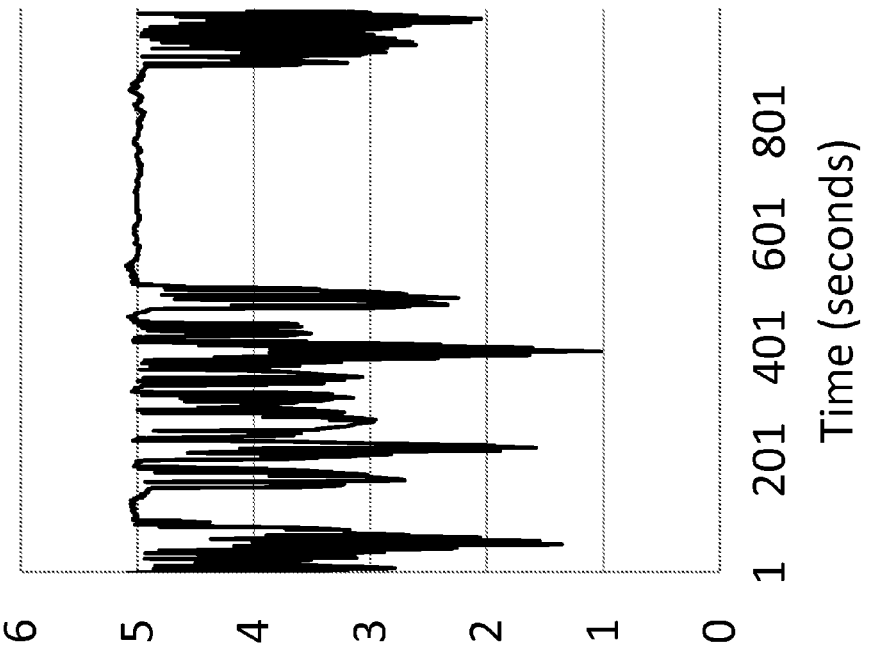
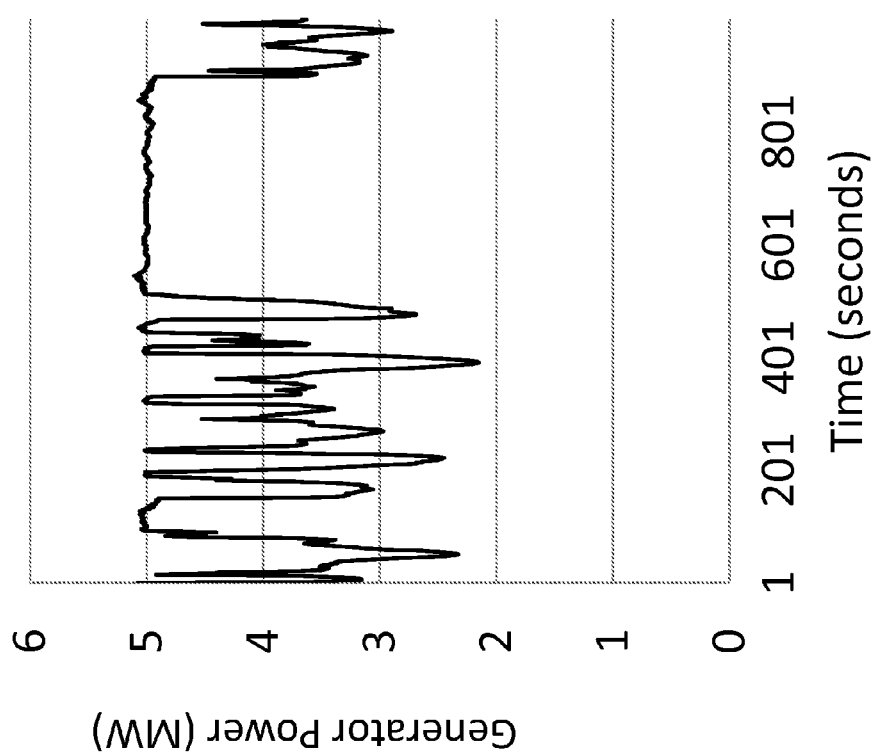

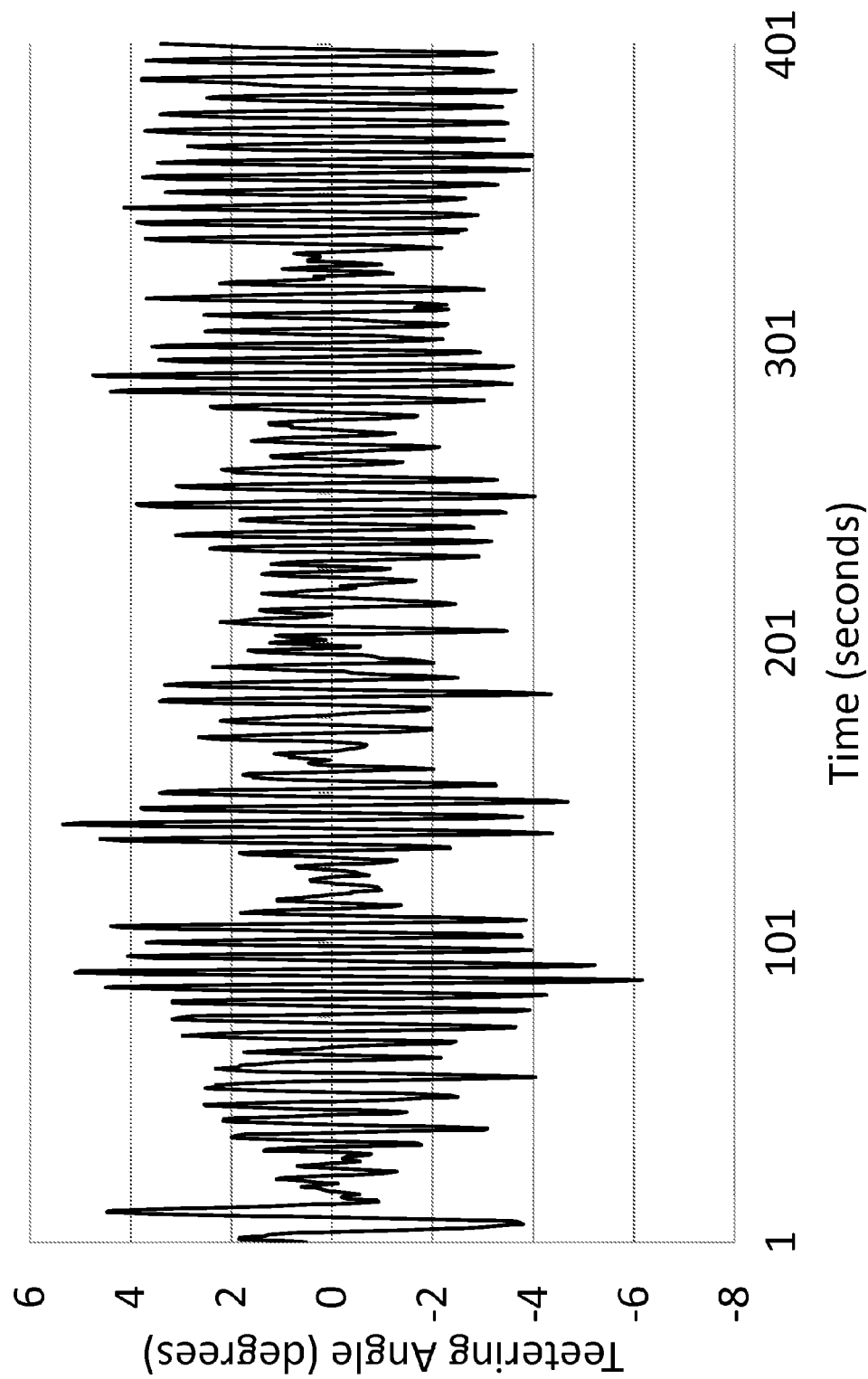
Fig. 30 —Blade 1 in 5-MW Turbine with Moderate Wind Profile

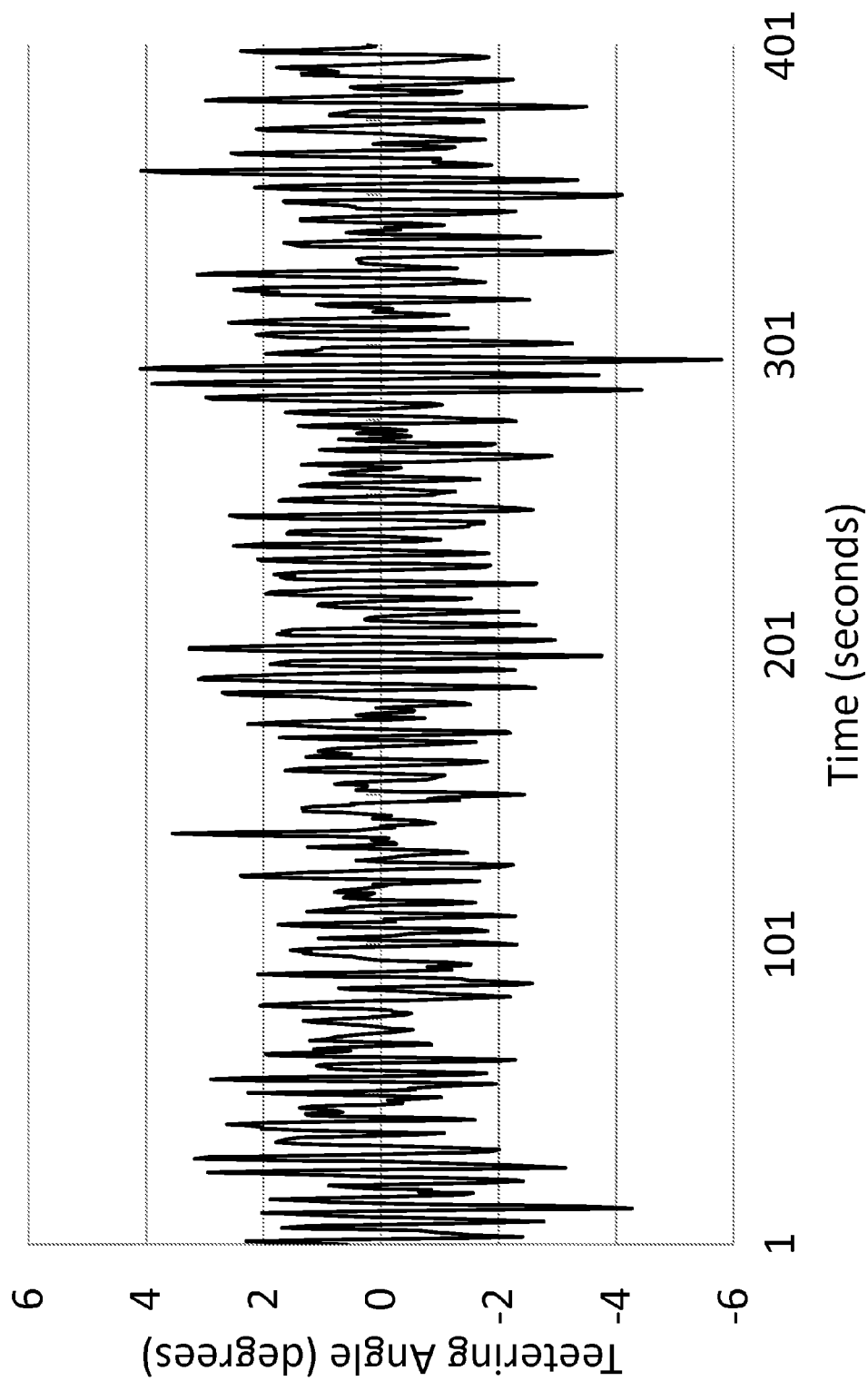
Fig. 31 — Blade 2 in 5-MW Turbine with Severe Wind Profile

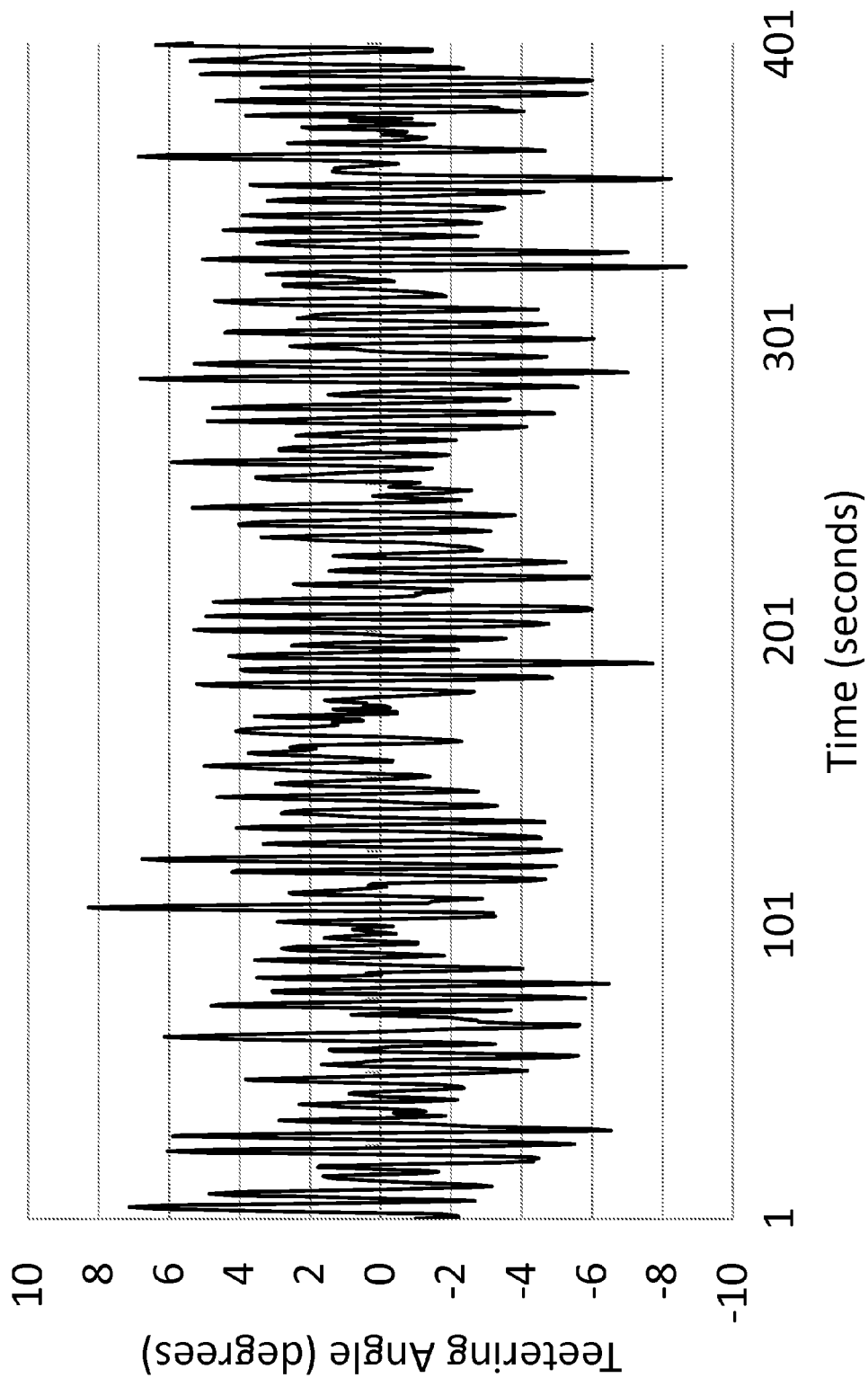
Fig. 32 — Blade 3 in 5-MW Turbine with Extreme Wind Profile

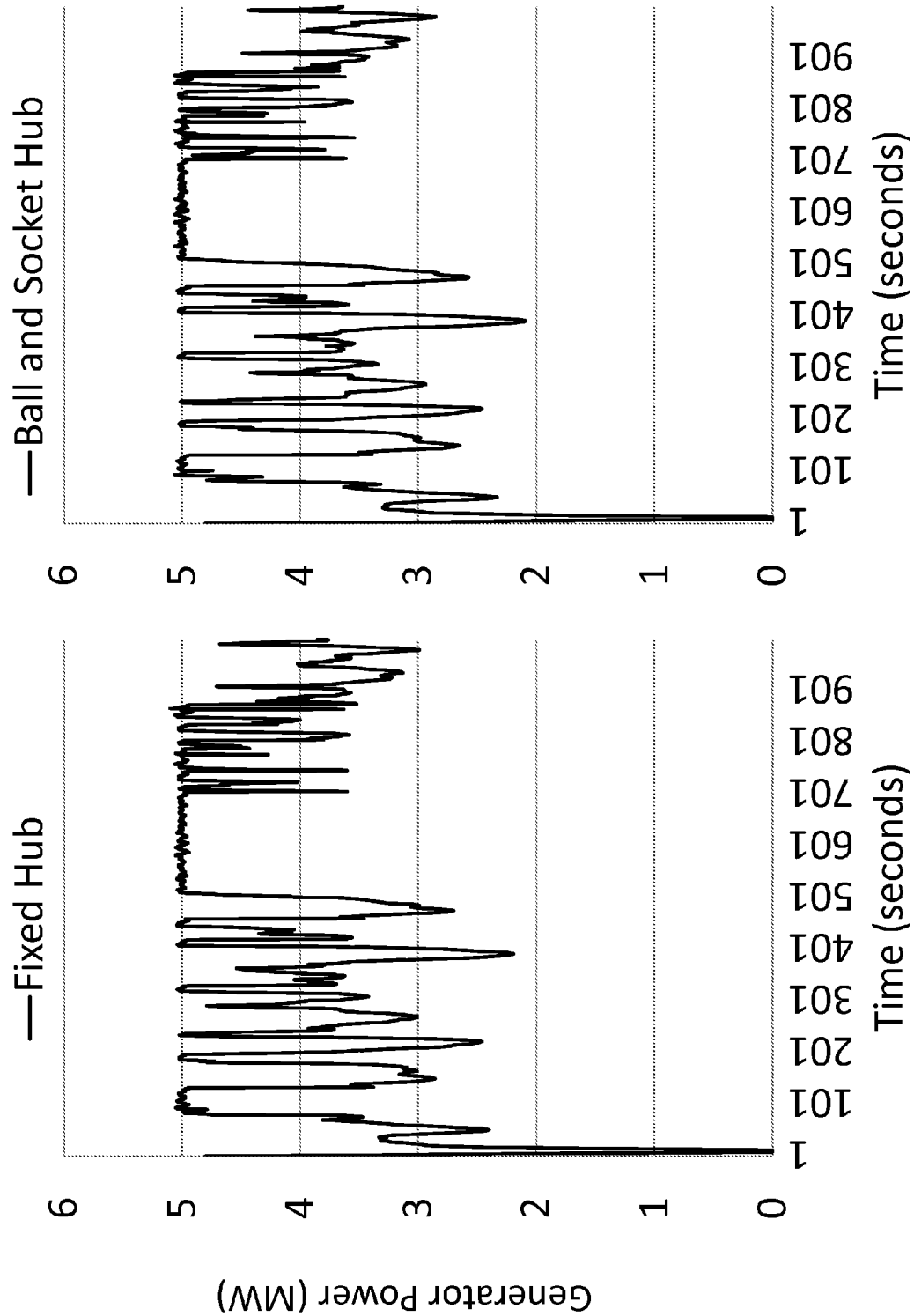

Fig. 37 — Ball and Socket Hub

Fig. 36 — Fixed Hub

Bending Moment at Main Shaft Tip about Rotating xa axis (kN-m)

Time (seconds)

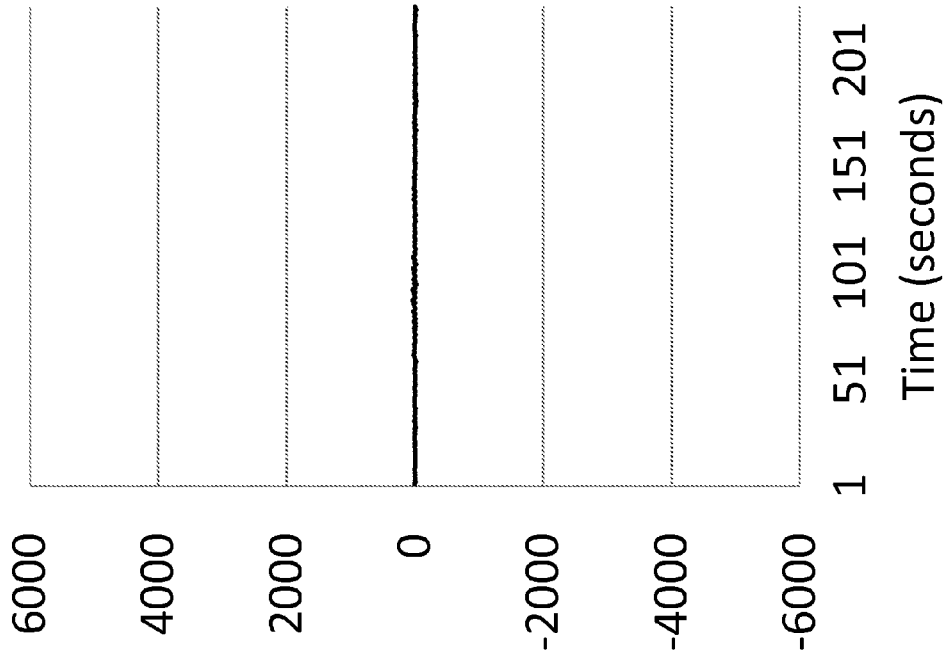
Fig. 38 —Fixed Hub
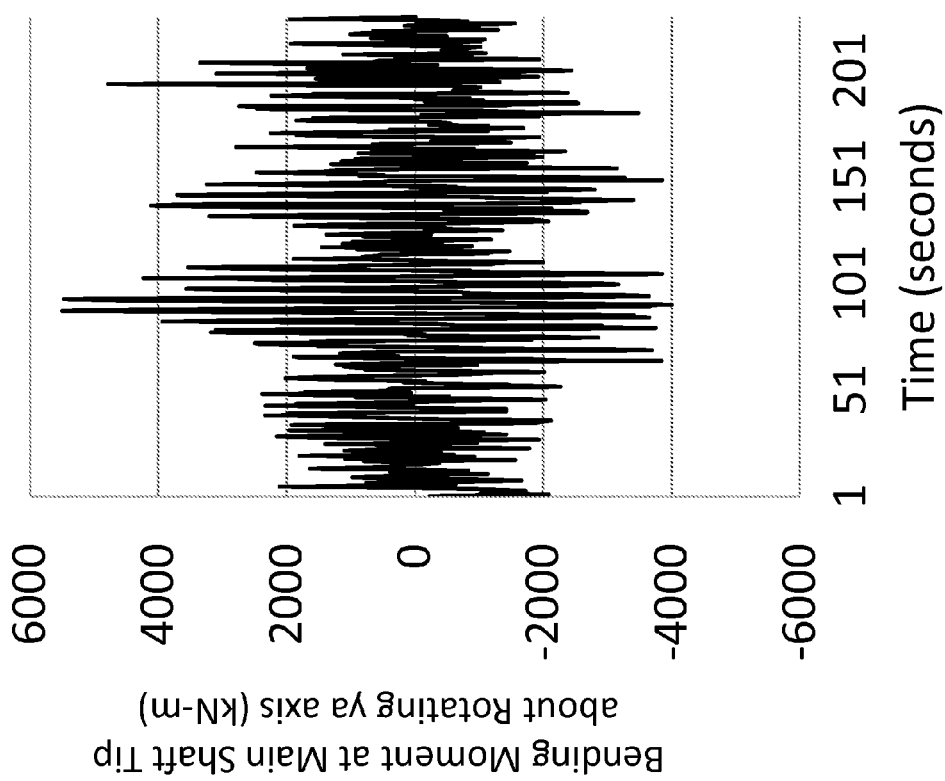
Fig. 39 —Ball and Socket Hub

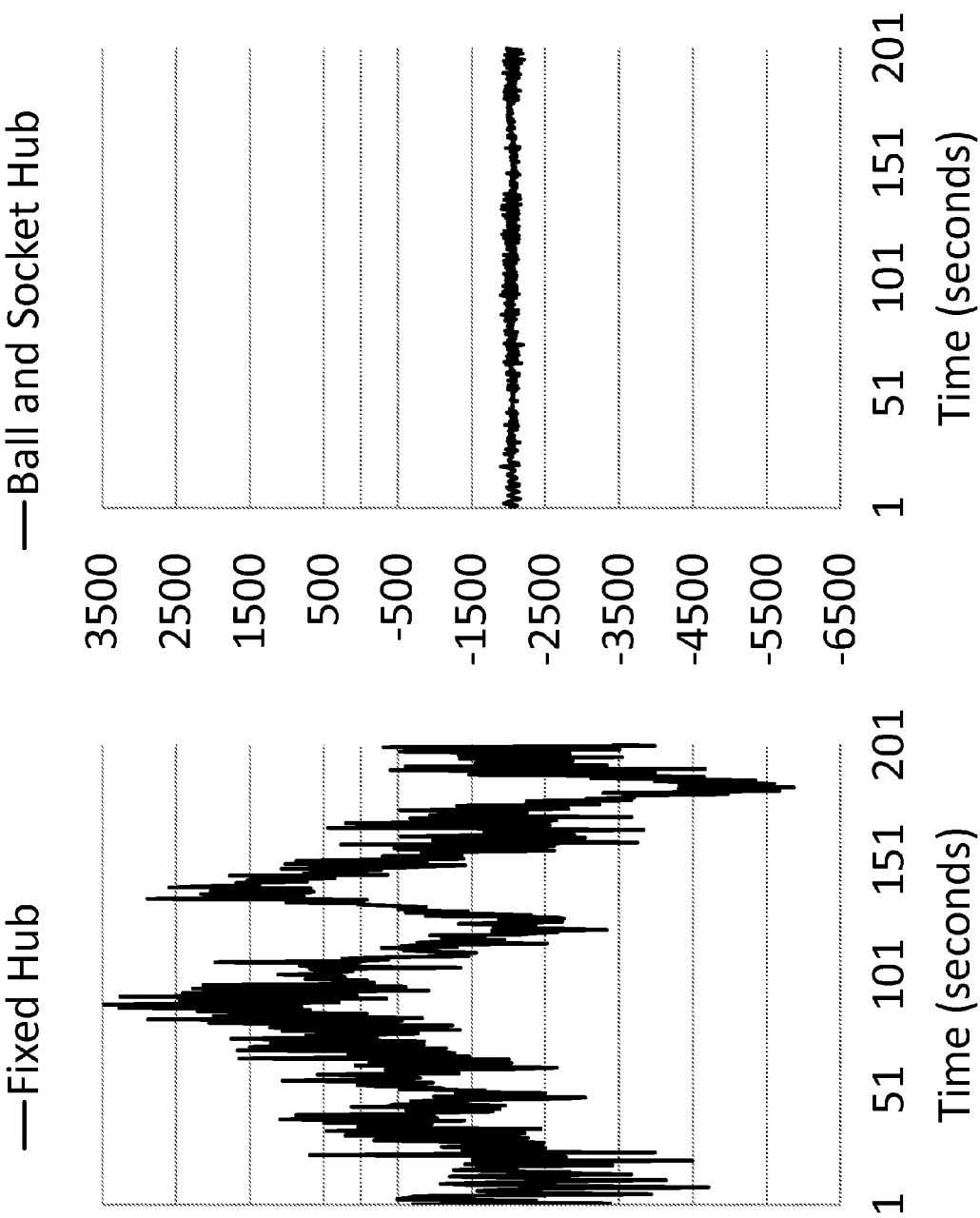
Fig. 40 — Fixed Hub
Fig. 41 — Ball and Socket Hub

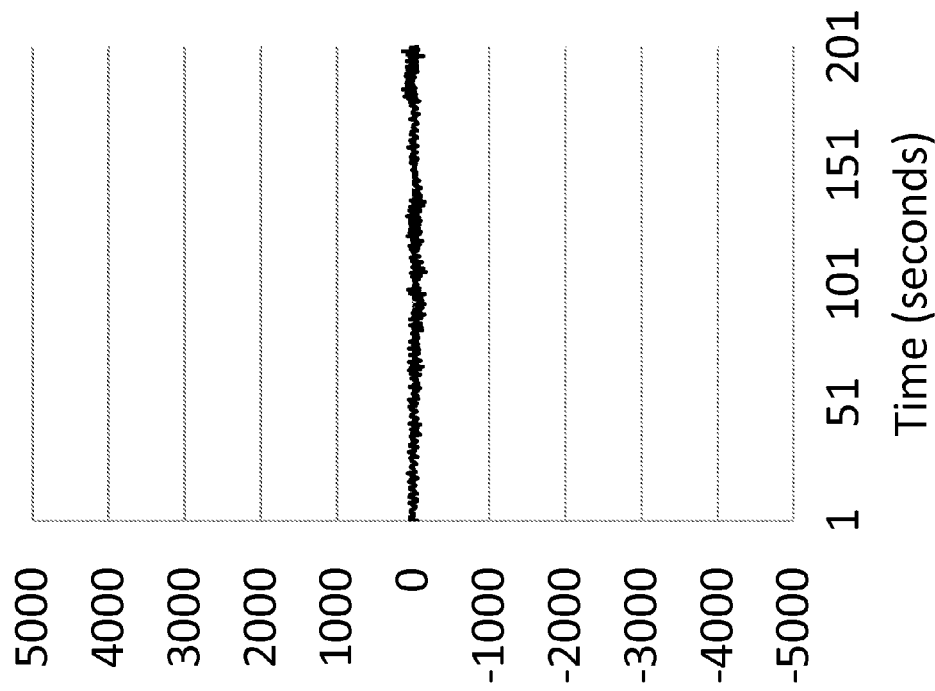
Fig. 43 —Ball and Socket Hub
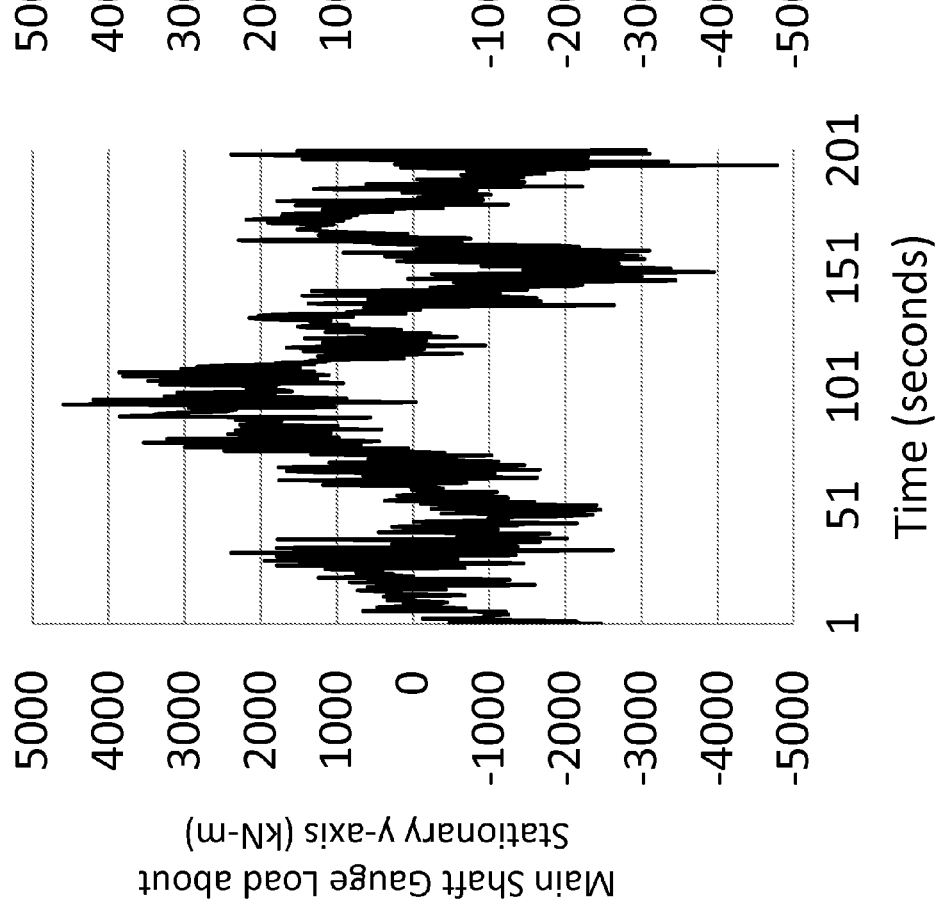
Fig. 42 —Fixed Hub
Main Shaft Gauge Load about Stationary y-axis (kN-m)

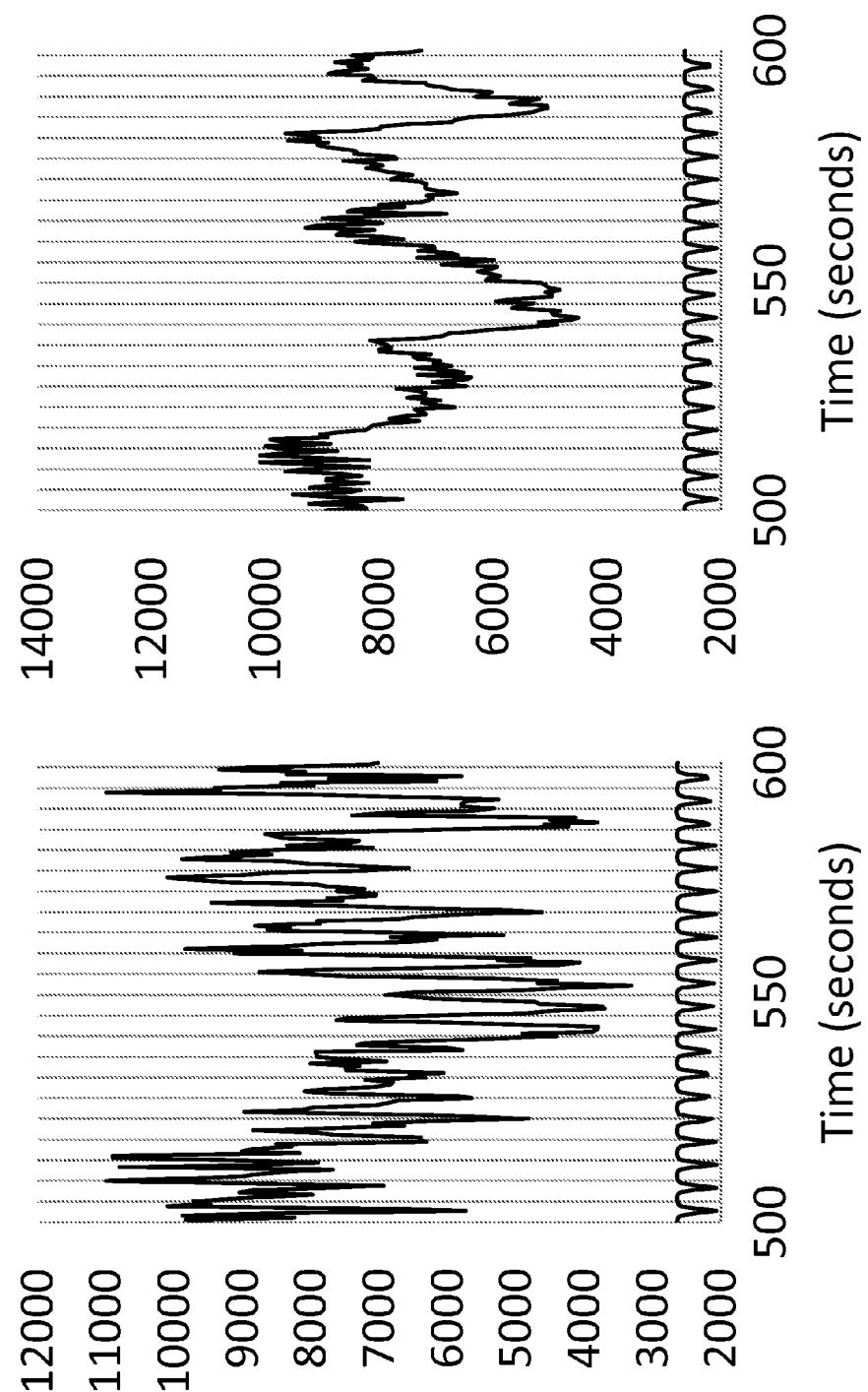

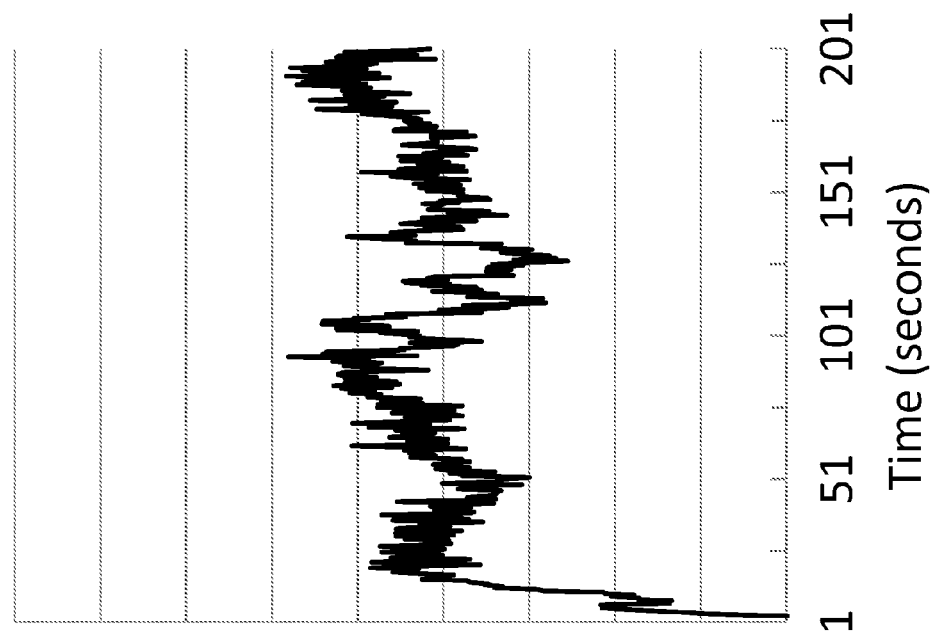
Fig. 47 —Ball and Socket Hub
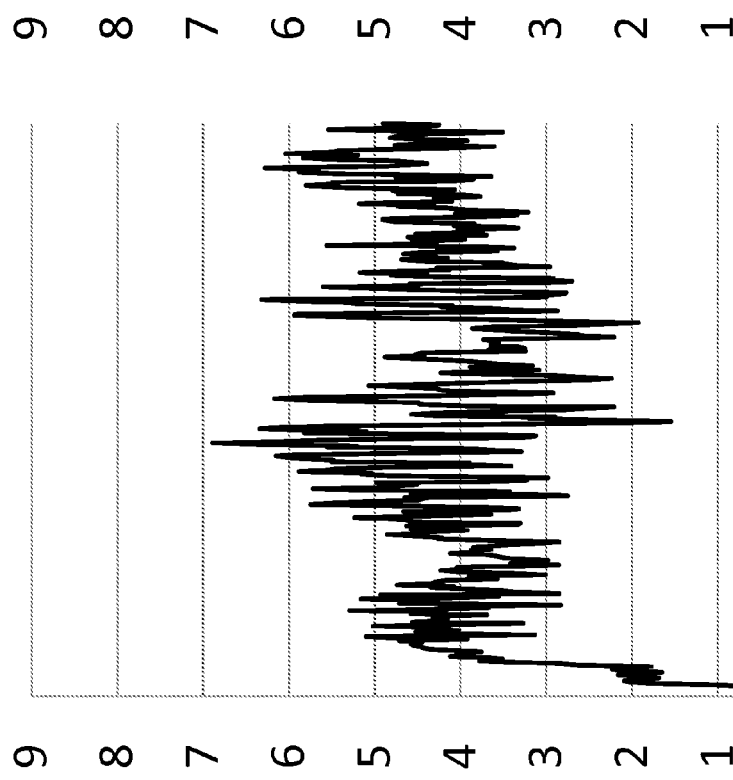
Fig. 46 —Fixed Hub

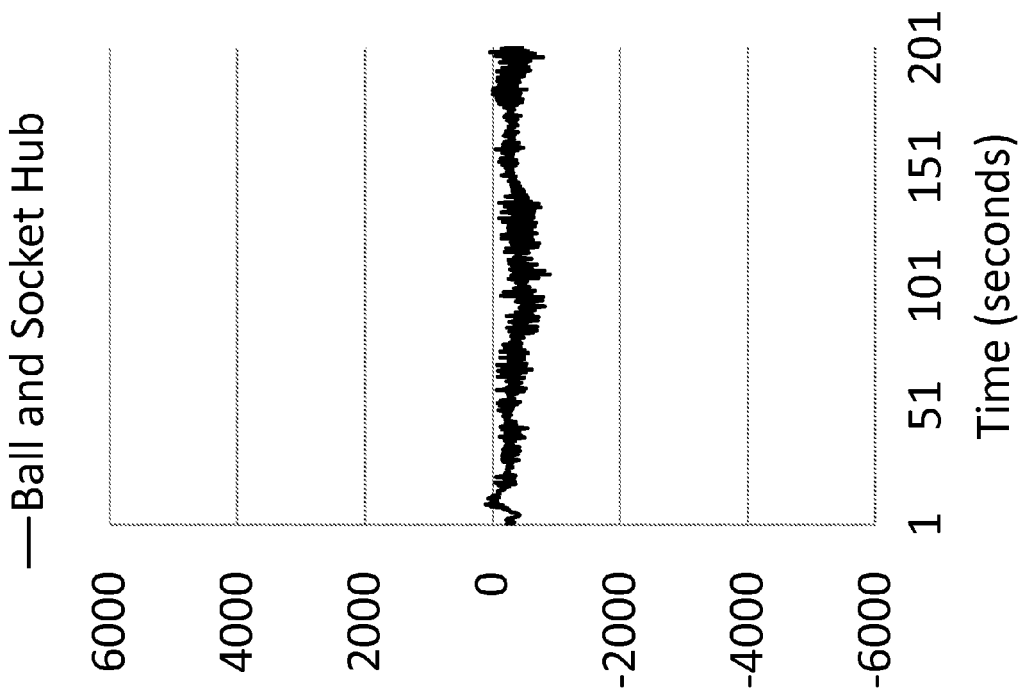
Fig. 49 — Ball and Socket Hub
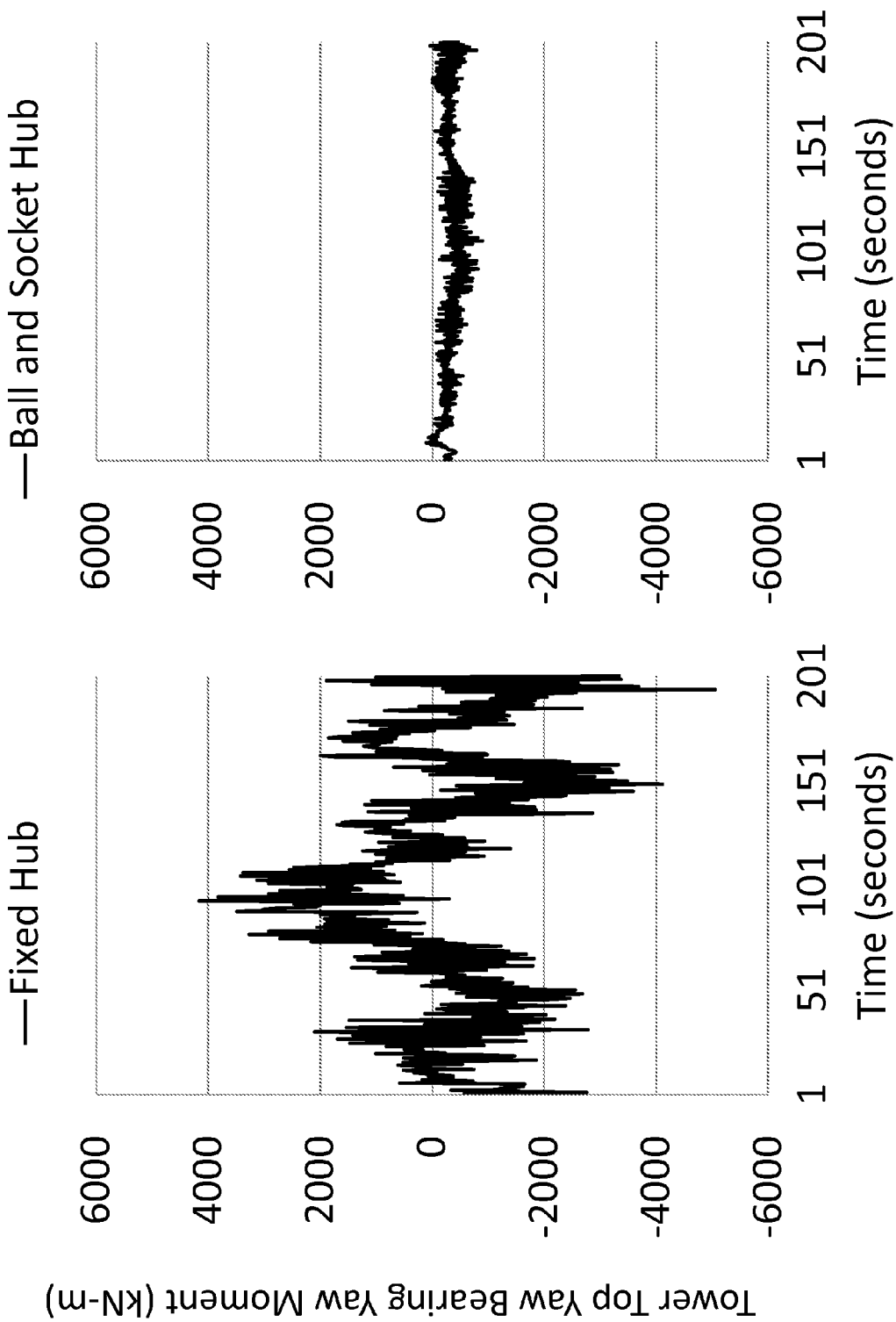
Fig. 48 — Fixed Hub
Tower Top Yaw Bearing Yaw Moment (kN-m)

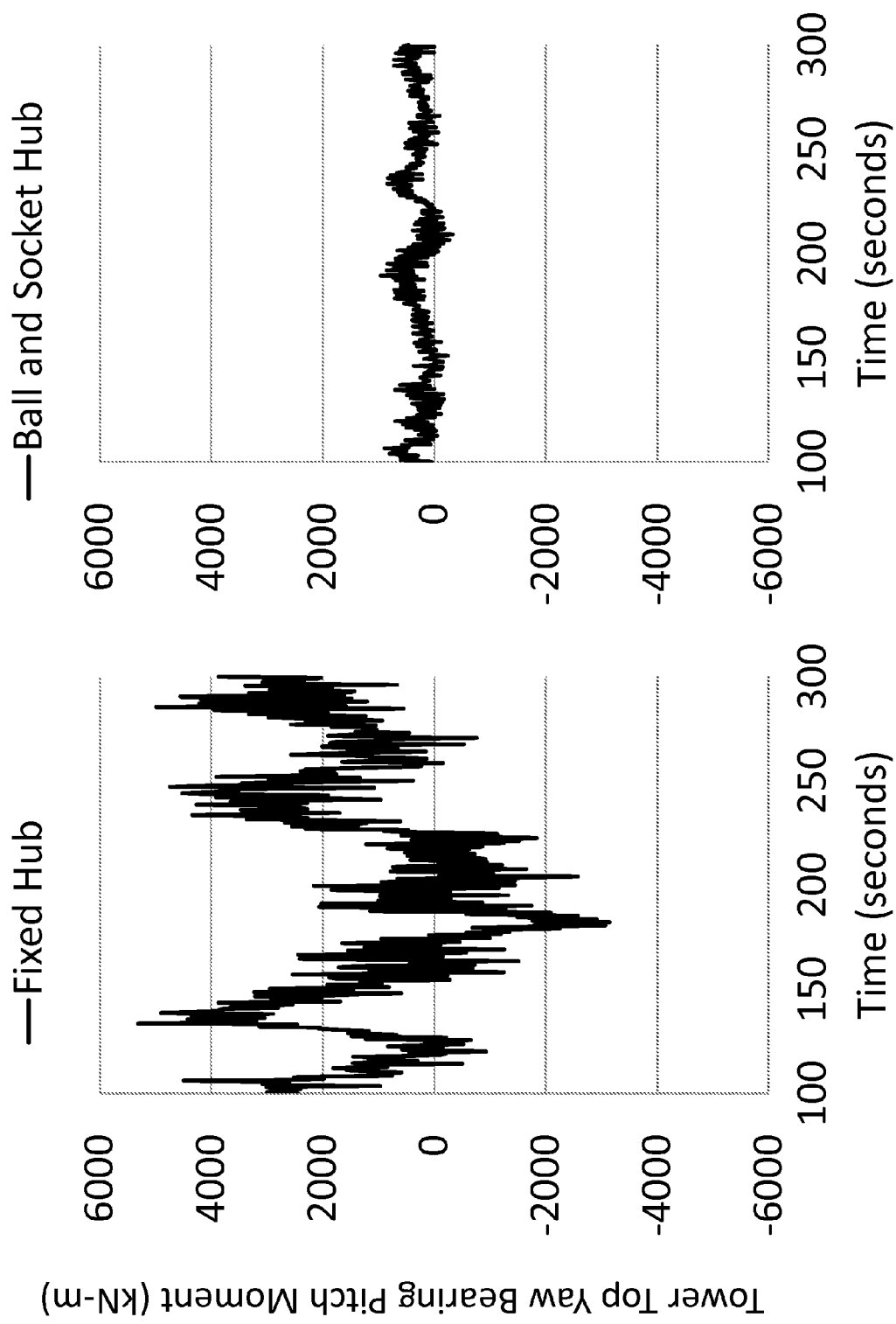

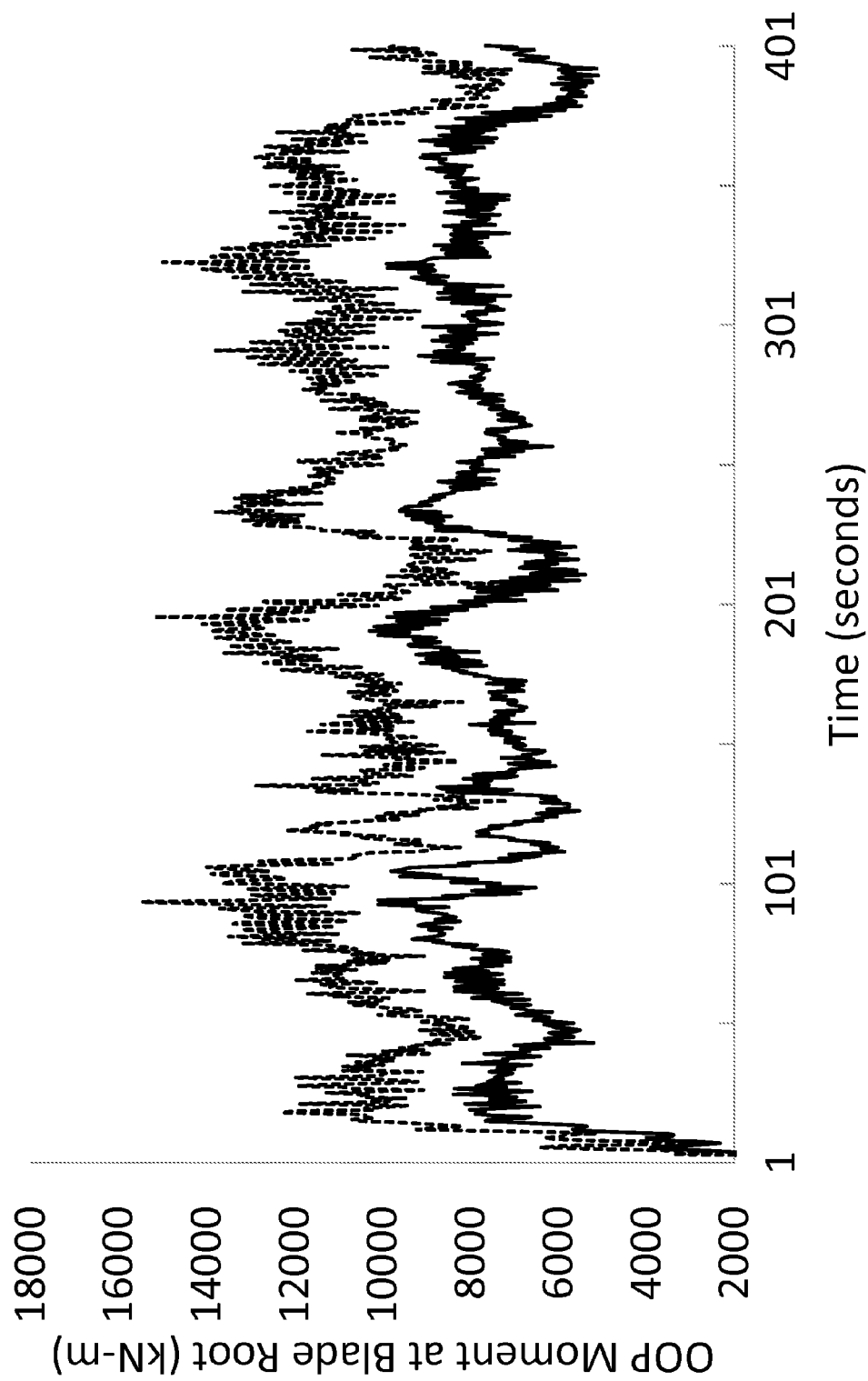

HORIZONTAL AXIS WIND TURBINE WITH BALL-AND-SOCKET HUB

CROSS REFERENCE TO RELATED APPLICATION

This patent application is a continuation-in-part of U.S. patent application Ser. No. 13/137,458, filed on Aug. 17, 2011, and subsequently issued as U.S. Pat. No. 8,708,654 on Apr. 29, 2014. The entire contents of the above-referenced application and patent are hereby incorporated by reference herein, for all purposes.

BACKGROUND OF THE INVENTION

The present invention relates to the field of wind turbine generators, and more particularly to the field of horizontal-axis wind turbines. One of the principal problems involved in designing horizontal axis wind turbines is wind shear, which is the variation of wind velocity with height above ground level. Wind velocities tend to increase with altitude due to aerodynamic surface drag and the viscosity of air. As a result, turbine blades at the top of the rotation experience higher wind velocities than blades at the bottom of the rotation. If not compensated for in the design of the wind turbine, this vertical wind velocity gradient will subject the wind turbine components to damaging stresses.

In addition to wind shear due to natural differences in wind velocity with altitude, wind shear can also be induced by improper alignment of the main shaft axis, i.e., not facing the axis at the optimal angle with respect to the wind direction. Most often, improper alignment results from changes in wind direction. If there is no wind shear, the rotor axis (the axis around which the blades are rotating) should face directly into the wind so that all blades will experience the same wind speed. If however, the main shaft axis is aligned obliquely to the wind in one direction, blades at the top of the rotation move into the wind, and blades at the bottom of the rotation will move with the wind. This will cause blades at the top of the rotation to experience a greater effective wind speed than blades at the bottom. Conversely, if the orientation of the main shaft is oblique to the wind in the opposite direction, blades at the bottom of the rotation will experience a greater effective wind speed than those at the top. Other sources of wind shear include tower shadow and shadow from neighboring wind turbines in a wind farm. Additionally, in aqueous environments, there are significant differences in the flow rate of the water. Typically water at the top of a flowing stream runs faster than water at the bottom of the stream.

Of vital importance in the design of wind turbine generators is operation of the turbine blades at the optimum tip speed ratio to extract as much power as possible out of the wind. Tip speed ratio is defined as the speed at the tips of the turbine blades divided by the speed of the wind. For example, if the wind is blowing at 20 mph and the blade tips are rotating at 100 mph, then the tip speed ratio is 5. If however, there is a wind velocity difference of 10 mph between the lowest and highest blade positions, the tip speed ratio will vary from 4 to about 7, thereby diverging from the optimum design point with consequent loss of efficiency. Variations in tip speed ratio due to wind shear also cause changes in the angle of attack of the turbine blades, which depends on the speed of the blades relative to the wind speed. The effect is to increase the angle of attack at the top of the blade's path and decrease it at the bottom. In the above example, the angle of attack will be increased by almost 3 degrees at the top and decreased by almost 3 degrees at the bottom. This can result in stall at the top and reduced lift power at the bottom.

The lift generated by turbine blades during rotation is applied both in the direction of rotation and in a backward direction. Forces applied in the direction of rotation (around z axis) are also designated as in-plane forces and forces applied in a backward direction (around x and y axes) are also designated as out-of-plane forces. Because of this, wind shear will cause more backward force to be applied to blades experiencing the greater effective wind speed. The stress produced by this unbalance in backward forces is augmented by the concomitant changes in the angle of attack of the blades. This cyclical stress on the blades and bearings can cause excessive wear, maintenance problems, and shorten the useful life of the wind turbine generator.

The prior art in this field has responded to the problems presented by wind shear through the use of a "teeter pin" that is part of the hub. A teeter pin provides for an additional degree of freedom by enabling the turbine rotor to pivot back-and-forth like a playground seesaw. This back-and-forth rotation results in a balancing of the torque on the blades around the teeter axis because blades experiencing the higher wind velocity move with the wind and blades experiencing the lower wind velocity move into the wind. Such teeter pins are useful as applied to two-bladed wind turbines, as they allow the upper blade to tilt backward while the lower blade tilts forward. Thus, the teetering motion of a two-bladed wind turbine tends to equalize the effective wind speeds for both blades, thereby maintaining a more constant tip speed ratio.

The limited seesaw pivoting enabled by teeter pins is, however, inadequate to compensate for wind shear in turbines having three or more blades. This is because teetering is limited to one blade moving forward and the other moving backward in an equal and opposite manner across a single rotating teeter axis. In view of the aforementioned limitations, there is a need for an improvement to be made to existing technology to combat these issues.

SUMMARY OF THE INVENTION

The present invention teaches a ball-and-socket hub that enables out-of-plane rotation about two perpendicular axes, enabling two or more blades attached to the hub to teeter. This extends the playground analogy such that the seesaw would have three seats extending from a ball and socket hub and each child's teetering motion would be opposite to the sum of the teetering motions of the other two.

The center of the ball-and-socket hub is defined as the origin of x, y and z axes, which are stationary axes. The y-axis is parallel to the yaw axis, through which the nacelle rotates about the tower to change the orientation of the rotor with respect to the wind. The z-axis is co-linear with the main shaft axis and is oriented approximately with the direction of the wind, and the x-axis is aligned horizontally and roughly parallel to the ground. An equivalent arrangement of axes is where the center of the ball-and-socket hub is defined by the intersection of the $x_a$, $y_a$ and z axes, where the $x_a$ and $y_a$ axes that rotate around the z axis.

The hub has a series of dynamic rotational couplers between the ball and socket that rotationally couples the ball and socket around the z-axis (or main shaft axis) so that rotational torque generated by the turbine blades is transferred from the socket to the ball. The dynamic rotational couplers are comprised of a coupling pair such that a smaller coupler can move freely within the perimeter defined by the larger coupler. The allowable movement of the smaller coupler enables the blades to teeter, or rotate about the $x_a$ and $y_a$ axes.

There are several types of dynamic rotational couplers that differ in various ways. First, the smaller coupler can be affixed to the ball, the hub socket, or to an independent transfer assembly within the hub socket. Second, the shape of the smaller coupler in cross section can be either generally circular or generally rectangular. If the smaller coupler is generally cylindrical (or circular in cross section), the smaller coupler is free to rotate about the cylindrical axis as it moves within the perimeter of the larger coupler. This rotation is caused by movement of the hub socket around the ball. As a consequence, a dynamic rotational coupler with the smaller part having generally cylindrical shape will follow the rotations of the hub socket around the $x_a$ and $y_a$ axes and thus retain the same alignment as the hub socket. If the smaller coupler is generally rectangular in cross section with two sides that are generally parallel to the elongated sides of the grooves, the smaller coupler remains aligned with the orientation of the longitudinal grooves (and the main shaft). Third, generally cylindrical couplers optimally contacts one side of the groove so that there is a small space on the other side of the groove. The generally rectangular couplers contact both sides of the grooves in order to maintain alignment with the grooves. Since the alignment of the dynamic rotational couplers is an important factor in determining usage, those that remained aligned with the main shaft are given the designation main-shaft aligned dynamic rotational couplers, and those that remained aligned with the hub socket are given the designation hub-socket aligned dynamic rotational couplers. In order to enable a dynamic rotation coupler to remain aligned with the main shaft axis, it is necessary to house an independent transfer assembly within the hub socket but not affix the two. To do this, the independent transfer assembly is fitted with a roller bearing as it passes through a passage in the hub socket enabling the independent transfer assembly to rotate within the hub socket. In this way, the hub socket is free to rotate about $x_a$ and $y_a$ axes whereas some of that free rotation is restricted with the independent transfer assembly because it is forced to remain aligned with the main shaft axis. For example, an independent transfer assembly positioned to support blade 1 will have rotation restricted to the $x_a$ axis. To achieve this, rotation of the hub socket around the $y_a$ axis is countered by an opposite rotation of the independent transfer assembly within the hub socket around the same axis. The outer end of the independent transfer assembly can either be affixed directly to the blades as a blade connector or linked by means of a pitch motor and separate blade connector. In this way, the blades remain aligned with the longitudinal grooves (and main shaft axis) and as a result, the pitch angle of the blades remains unchanged during teetering. In contrast, the pitch angle of blades with hub-socket aligned dynamic rotational couplers will assume the alignment of the hub socket and will thus change with teetering. If there is a pitch motor, the gear from the pitch motor meshes with gears from a blade connector and desired changes in pitch angle can be made. In order to assure that the independent transfer assembly remains within the hub socket, the diameter of the roller bearing is wider at the center than at the ends.

Enabling out-of-plane rotation of the blades adds an additional degree of freedom for turbines equipped with two blades and two additional degrees of freedom for turbines equipped with three or more blades. If there two blades, blades are free to rotate around a rotating axis ($x_a$) that is perpendicular to the pitch axis of the blades. This movement is identical to that of a turbine equipped with a teeter pin. If there are three or more blades attached to the ball-and-socket hub, blades are free to rotate with two degrees of freedom around perpendicular axes. These axes can be either stationary (x and y) or rotating ($x_a$ and $y_a$). With axes that rotate with the blades, blade 1 is positioned 90° relative to axis $x_a$ and is aligned with axis $y_a$. Blades 2 and 3 are positioned at 330°, 210°, respectively with respect to axis $x_a$. FIG. 3 shows the relationship of the blades to the $x_a$, and $y_a$ axes.

Enabling the ball-and-socket hub to rotate around the $x_a$ and $y_a$ axes minimizes differences in torque about these axes. These teetering rotations result in significant reductions of cyclic stresses on the blades, the main shaft and main shaft bearing, the yaw bearing and the tower. Basically, the same benefits realized by enabling a two-bladed wind turbine to teeter are also realized by enabling a three-bladed turbine to teeter. Enabling teetering with three blades has a very important advantage over teetering with two blades because the added blade and the added teetering degree of freedom add a measure of randomness that disrupts the onset of resonant teetering. Additionally, a wind turbine is comprised of many parts that have one or more natural frequencies of vibration. Resonant teetering with a part of the wind turbine (e.g., the tower) occurs as the teetering frequency (or a multiple of the teetering frequency) approaches one of the natural frequencies of the vibrating part. For a teetering two-blader, this predominately occurs twice per revolution (2P). If resonant teetering were to occur with a three-blader, it is expected that resonance would occur at a higher frequency (3p) and that this higher frequency likely reduces the possibilities for resonance. Manufacturers of teetering, two-bladed turbines use measures to control resonant teetering such as pitch-teeter coupling and teetering dampening. Due to the significantly reduced likelihood for resonant teetering with three blades, these measures are likely not necessary and greater teetering angles are possible.

The present invention describes means for protecting the ball-and-socket hub as well as other parts of the wind turbine. The ball-and-socket hub is protected from the environment by having a surrounding nose cone and an inner hub protector. The inner hub protector is made of a flexible material, as this enables the hub socket to move with respect to the main shaft. The wind turbine is protected from excessive teetering by limiting the length of the larger part of the dynamic rotational coupler. The invention describes use of soft stops made of a shock absorbing material that are placed at the ends of the larger part so that the jolt of the smaller part hitting the larger part is reduced. Another means of protecting the turbine from excessive teetering is to use linear actuators housed in the Nacelle. The linear actuators have a rotating member at the end that would contact a flat surface either at the back of the hub socket or at the back of the nose cone. The invention describes optional use of laser measuring devices that can monitor the orientation of the hub socket. With this information, it would be possible to actively orient the hub socket to a desired orientation by having a computer control movement of the linear actuators.

Finally, the ball-and-socket is designed so that the blades and the hub socket align in a plane. This assures that the rotor retains rotational symmetry and as a result, balances the forces about both the rotor axis and the main shaft axis. The central feature of the present invention, the ball-and-socket hub, will now be described in further detail.

BRIEF DESCRIPTION OF THE DRAWINGS

FIG. 3 is a front view of the blades showing the $x_a$ and $y_a$ axes;

FIG. 4 shows the hubs socket and main shaft ball for the preferred embodiment of the present invention;

FIG. 5 shows an expanded view of the hub socket and main shaft for the preferred embodiment of the present invention;

FIG. 8 is a side view of the main shaft ball, main shaft, longitudinal grooves and soft stops for the preferred embodiment of the present invention;

FIG. 9 is a view of the main shaft ball and longitudinal grooves where the volume of the main shaft ball has been reduced by removing some of the unnecessary volume.

FIG. 16 is a side detail view of the main shaft ball and the main shaft of the second preferred embodiment of the present invention;

FIG. 17 is a cutaway perspective detail view of the hub socket of the second preferred embodiment of the present invention;

FIG. 18 is a detail side view of the main shaft ball of the second preferred embodiment of the present invention, where the coupling rods have been rotated 20° about the y-axis;

FIG. 19 is a side detail view of the main shaft ball and main shaft of an exemplary embodiment of the present invention;

FIG. 20 is a detail view of a portion of the inner socket sphere of an exemplary embodiment of the present invention based on mechanical rotational coupling;

FIG. 21 is a side view of design 1 of the optional nose cone and the inner hub protector with the hub removed for clarity;

FIG. 22 is a back view of design 1 of the optional nose cone and the inner hub protector;

FIG. 26 is a top view of the rotor and nacelle without rotation about the y-axis;

FIG. 27 is a top view of the rotor and nacelle with rotation about the y-axis; and FIGS. 28-57 show computer modeling results for the present invention.

DETAILED DESCRIPTION

Figure 1:
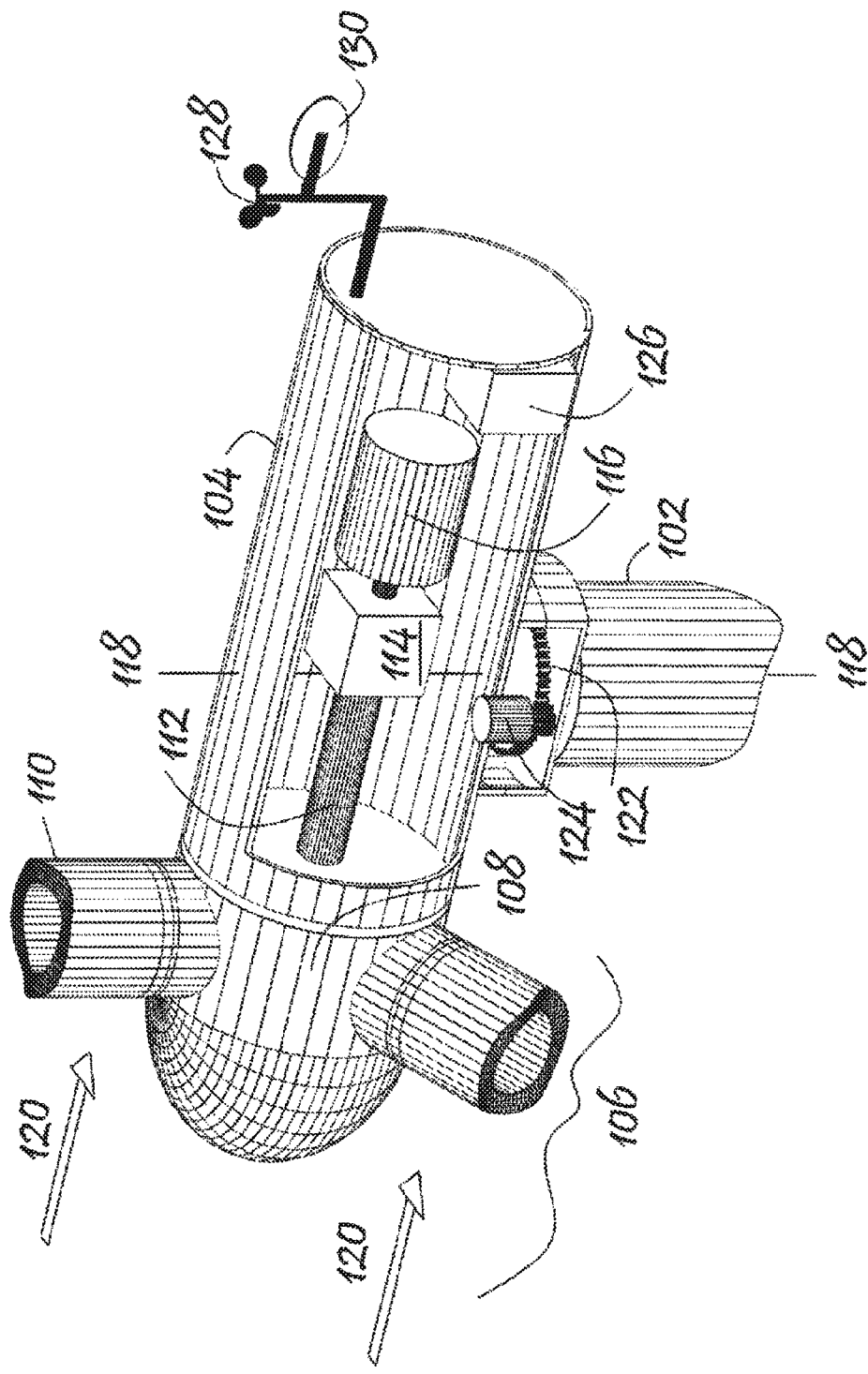
FIG. 1 is a perspective view of a typical horizontal-axis wind turbine generator, depicting the principal components thereof.

The preferred embodiments of the present invention will now be described with reference to the drawings. Identical elements in the various figures are identified, as far as possible, with the same reference numerals. Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

The prior art as depicted in FIG. 1, shows a typical horizontal wind turbine generator comprises a vertical cylindrical tower 102, a horizontal nacelle 104 and a rotor 106. The rotor 106 comprises a rotor hub 108, from which extend two or more blades 110. The rotor hub 108 is axially connected to a main shaft 112, which transmissively connects through a gear box 114 to a generator 116 in the nacelle 104. The nacelle is rotatably attached to the tower 102, such that the nacelle 104 and rotor 106 can be rotated about a yaw axis 118, which axially extends vertically through the tower 102. The rotation about the yaw axis 118 is used to keep the rotor 106 pointed into the wind, i.e., to keep the z-axis aligned with the wind direction 120. This yaw rotation is actuated by a yaw drive 122 and yaw motor 124 in the top of the tower 102, which in turn is controlled by a microprocessor controller 126 in the nacelle 104, based on readings from an anemometer 128 and a wind vane 130.

Figure 2:
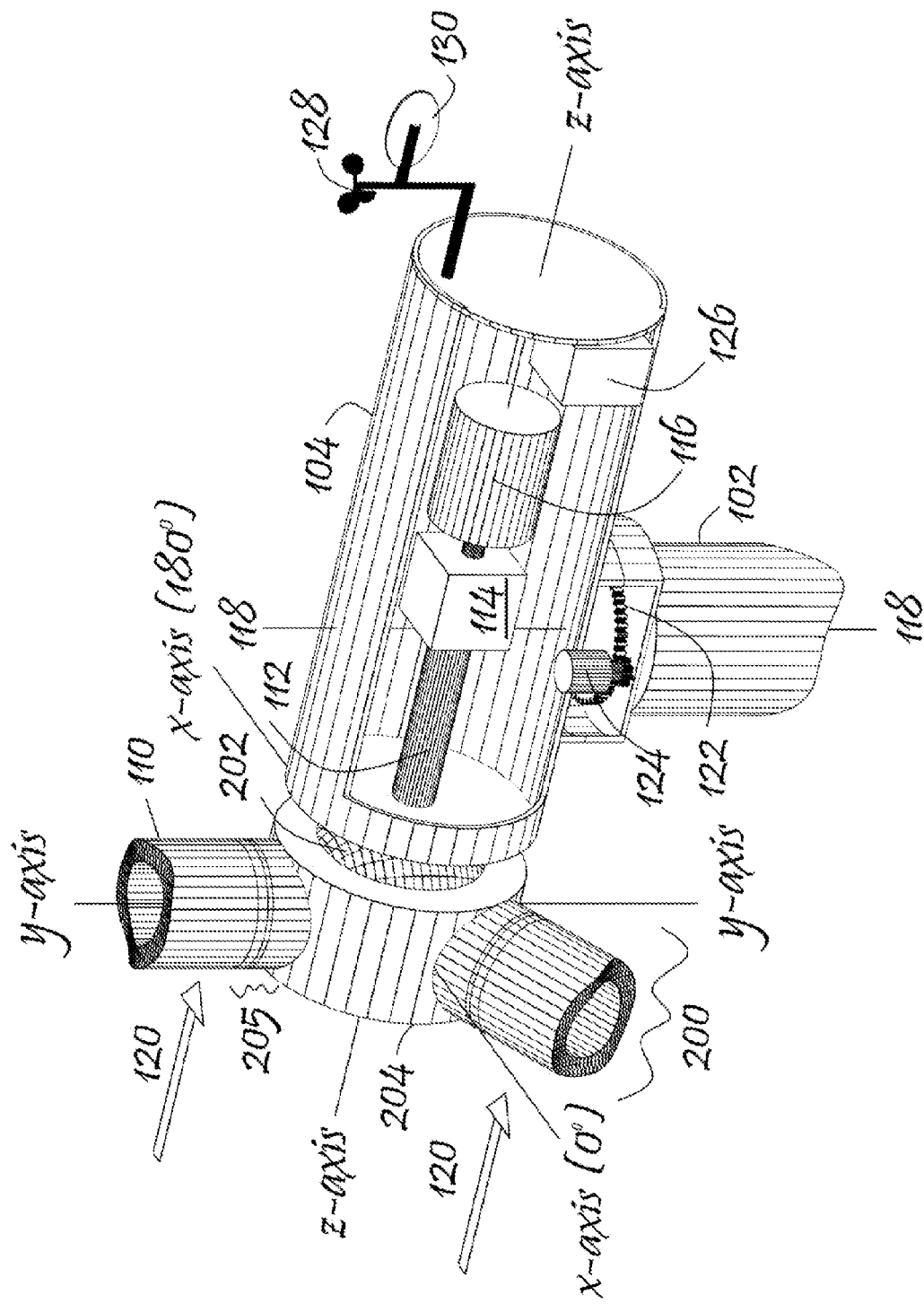
FIG. 2 is a perspective view of a horizontal-axis wind turbine generator, where a ball-and-socket hub has replaced the rotor hub, as well as orientations of the x, y and z axes.

The typical wind turbine generator as shown if FIG. 1 is modified by replacing the rotor hub 108 with a ball-and-socket hub 200 as depicted in FIG. 2. As shown in FIG. 2, the ball-and-socket hub 200 of the present invention comprises a main shaft ball 202, a hub socket 204 and outer hub 205 that surrounds the main shaft 112. This change in the design of the hub applies to all embodiments of the present invention.

FIG. 3 shows the $x_a$, $y_a$ axes intersect at the center of the main shaft ball 202, are perpendicular to each other and rotate with the blades around the z-axis. The figure shows the $y_a$ axis is also the pitch axis of blade 1 132. Changes in the pitch angle of blade 1 110-1 will occur if blade 1 rotates around the $y_a$ axis. Blade 1 will teeter without changing the pitch angle by rotating about the $x_a$ axis exclusively. FIG. 3 shows blade 2 110-2 and the pitch axis of blade 2 134. Similarly, the figure shows blade 3 110-3 and the pitch axis of blade 3 136.

The present invention is based on a transfer of rotation around the z-axis from the hub socket to the main shaft ball by multiple transfer means. In the preferred embodiment, transfer is based upon use of aligned dynamic rotational couplings and independent transfer assemblies. The hub socket and main shaft ball for the preferred embodiment of the present invention is shown in FIG. 4. The figure shows the assembled ball-and-socket hub with a main shaft ball 202, hub socket 204, the top of independent transfer assembly 260 and a series of longitudinal grooves 232. In order to view the preferred embodiment in more detail, FIG. 5 shows an expanded view. The figure shows the independent transfer assembly 260 is comprised of coupling base 252, transfer bearings 256, and a pitch motor support 258. FIG. 5 shows the coupling base axis 294 about which the coupling base rotates within the hub socket. The figure also shows a groove fitting 254 which is affixed to the inner end of the coupling base 252. FIG. 5 shows a larger bearing recess 276 to accommodate a blade connector bearing 284 (FIG. 12) and a smaller bearing recess 278 to accommodate a transfer bearing 256.

Figure 7:
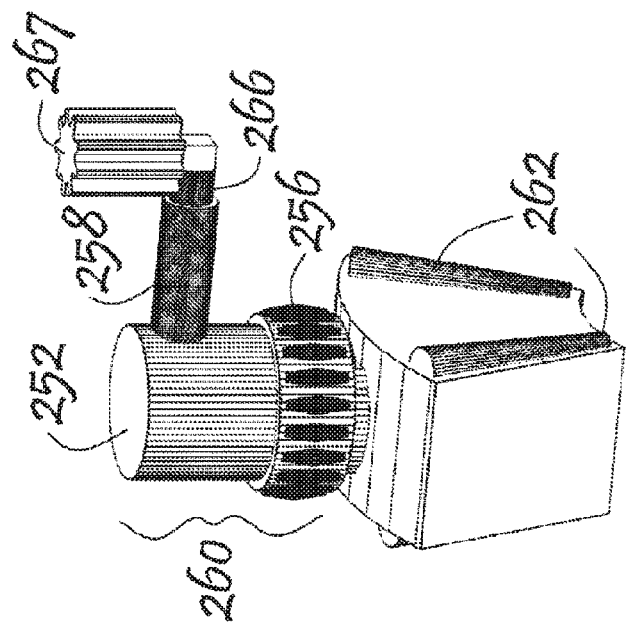
FIG. 7 is a perspective view of the independent transfer assembly and affixed groove fitting.
Figure 6:
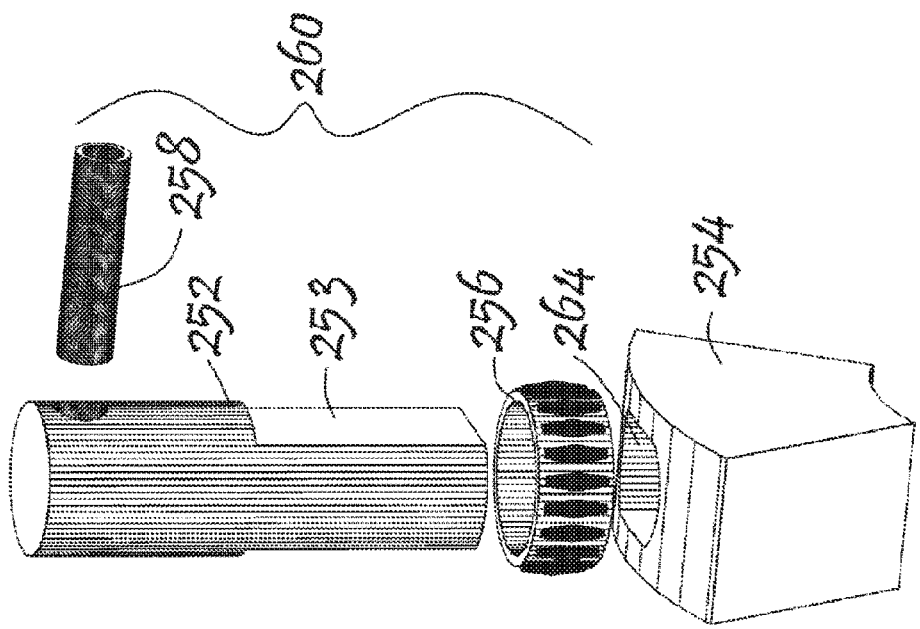
FIG. 6 is a perspective view of the rotational coupling base, groove fitting, transfer bearing, and pitch motor support for the preferred embodiment of the present invention.

FIG. 6 shows an expanded view of the independent transfer assembly 260 and the groove fitting 254. The figure shows a coupling base 252, groove fitting 254-a, an alternate groove fitting 254-b, transfer bearings 256, and pitch motor support 258. The independent transfer assembly 260 is created by affixing transfer bearings 256 and the pitch motor support 258 to the coupling base 252. FIG. 6 shows an arrangement where the inner end of coupling base 252 fits within a complementary hole 264 in groove fitting 254-*a* and suitable means would be used to affix the two. Another possible arrangement would be to use the inner end of the coupling base 252 to function as the groove fitting 254-*b*. The groove fitting 254 (254-*a* or 254-*b*) has two sides that are generally parallel to the elongated sides of the longitudinal grooves. Optionally, the groove fittings can have bearings to provide for smooth movement across the longitudinal grooves 232 (FIG. 8) of the main shaft ball 202 (FIG. 8). FIG. 5 and FIG. 7 show an arrangement with two tapered bearings 262 on each side of the groove fitting 254. Ideally the bearings are tapered to eliminate slippage during movement across the longitudinal grooves. FIG. 6 shows transfer bearings 256 that fit over the coupling base 252 to enable smooth rotation of the independent transfer assembly 260 within the hub socket 204 (FIG. 4). Rotation of the independent transfer assembly occurs around the coupling base axis 294 (FIG. 5), which is co-linear with the pitch axis of one of the blades (FIG. 3). Preferably, the transfer bearings 256 have a greater diameter at the center in order to assure that the independent transfer assembly 260 stays within the hub socket. FIG. 7 also shows the pitch motor 266 and pitch motor gear 267. The independent transfer assembly 260 is affixed to the pitch motor 266, either directly or by means of a linkage. FIG. 7 shows a linkage where one end of a pitch motor support 258 fits into a hole at one end of the independent transfer assembly 260 and the other end of the pitch motor support is affixed to the pitch motor 266.

FIG. 8 shows the main shaft ball 202, main shaft 112, longitudinal grooves 232, and soft stops 268 of the preferred embodiment of the present invention. The figure shows the main shaft ball 202 has longitudinal grooves 232 to accommodate the groove fittings of the independent transfer assemblies 260 (FIG. 7). The longitudinal grooves 232 are uniformly equatorially distributed, which means that they are centered on and uniformly distributed around an equator of the main shaft ball 202 that is perpendicular to the z-axis. The longitudinal grooves 232 are elongated in the direction of the main shaft, or z-axis. FIG. 9 shows a modified version of the main shaft ball 202 and longitudinal grooves 232 with reduced mass. The figure shows that the main shaft ball requires a spherical surface only in the areas that contact the hub socket. FIG. 9 also shows an optional plurality of bearings 263 located on the sides of the longitudinal grooves. In this arrangement, the groove fitting would not be fitted with bearings as shown in 254 (FIG. 6).

Figure 13:
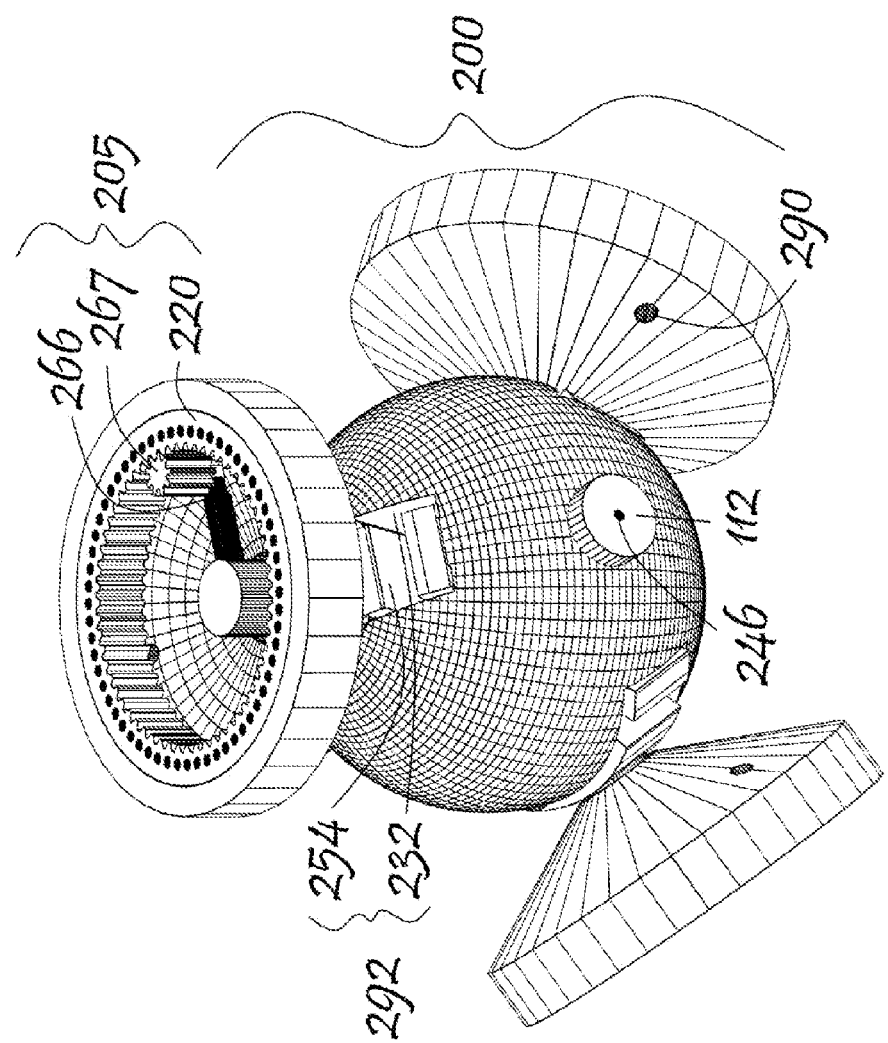
FIG. 13 shows a perspective view of the ball-and-socket hub, main shaft, pitch motor gear, and blade connector for the preferred embodiment of the present invention.

The groove fitting 254 (FIG. 6 or FIG. 7) and the longitudinal grooves 232 together form the main-shaft aligned dynamic rotational coupler 292 (FIG. 13). Optionally, the main shaft ball may have interspersed longitudinal grooves for dynamic rotational couplers (not shown). At the ends of the longitudinal grooves are soft stops 268. The soft stops can be made from a series of springs or various pliable materials that give upon contact with the groove fitting in order to prevent a sudden jolt to the main shaft ball and to minimize the possibility of damage to the ball-and-socket hub. The soft stops 268 shown in FIG. 8 enable a maximum unconstrained teetering of ±10° prior to the groove fitting 254 (FIG. 6) contacting the soft stop 268.

Figure 11:
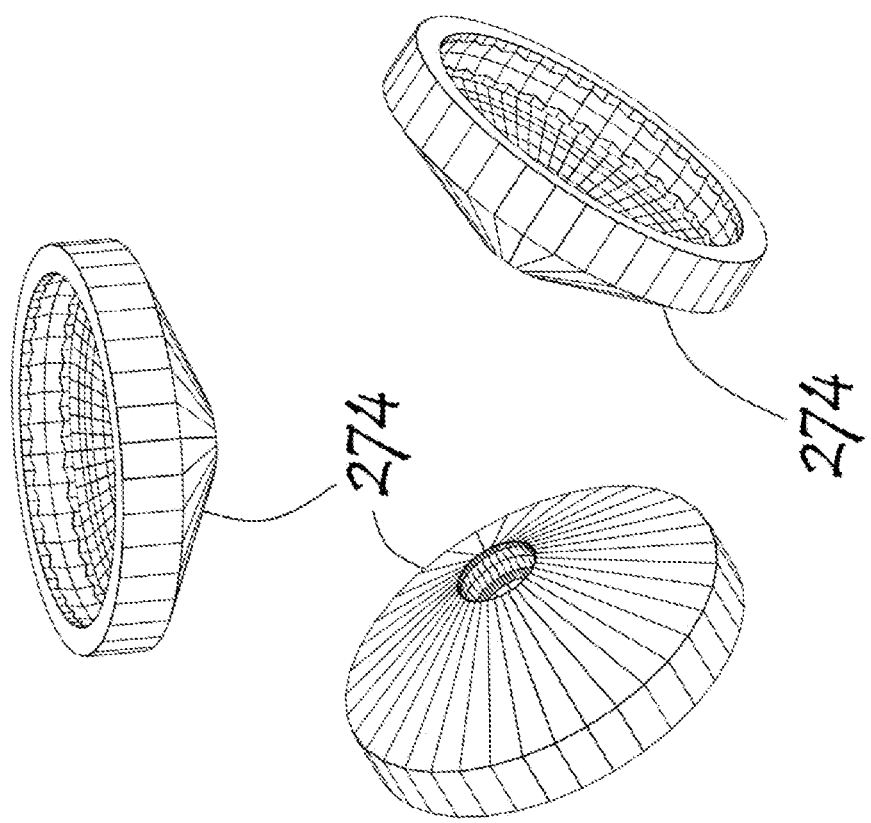
FIG. 10 shows a perspective view of the hub socket housing connectors and FIG. 11 shows a perspective view of the hub socket housings for the preferred embodiment of the present invention.
Figure 10:
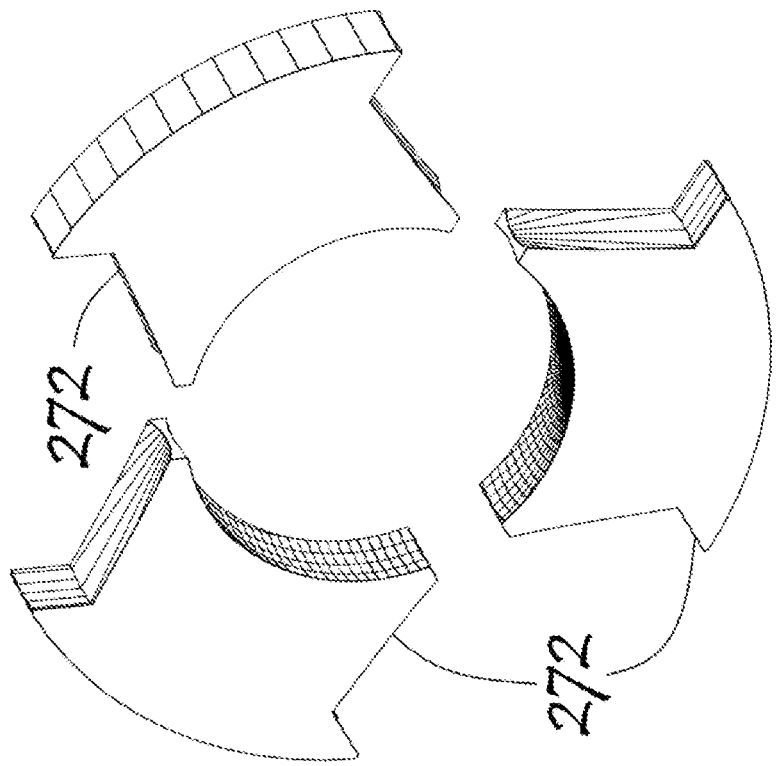

The hub socket is most easily constructed around the main shaft ball by affixing separate parts. FIG. 10 shows a series of hub socket housing connectors 272 and FIG. 11 shows a series of hub socket housings 274. The hub socket housings and hub socket housing connectors are affixed to enable the hub socket 204 to surround the main shaft ball 202 as shown in FIG. 4. FIG. 10 shows the inner surface of the hub socket housing connectors 272 is a portion of the surface of a sphere having a slightly greater diameter than that of the main shaft ball 202 (FIG. 4), which it slidably surrounds.

Figure 12:
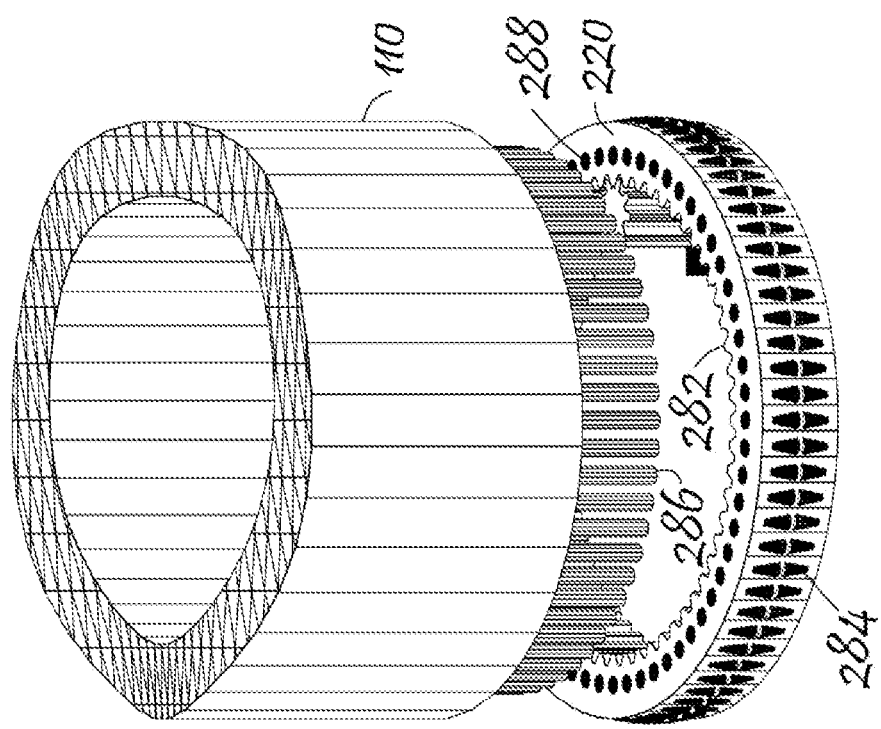
FIG. 12 shows the blade connector and blades for the preferred embodiment of the present invention.

FIG. 12 shows a blade connector 220 and blade 110. The blade connector has an internal gear 282 at the inner diameter. At the outer diameter is a blade connector bearing 284 that enables smooth rotation of the blade connector within the hub socket housing 274 (FIG. 11). The blades are secured to the blade connector by fitting the studs 286 from the blade 110 into a series of holes 288 in the blade connector. Optionally, a series of access holes 290 (FIG. 13) can be included in the hub socket housing to provide space to affix fasteners to the studs from the blade. FIG. 13 shows a perspective view of the ball-and-socket hub 200 with the main shaft 112, and outer hub 205 included. The pitch motor 266, pitch motor gear 267 and blade connector 220 comprise the outer hub 205. The figure shows the longitudinal groove 232 and groove fitting 254 which together comprise the main-shaft aligned dynamic rotational coupler 292. FIG. 13 also shows the center of the main shaft 112 has a pitch control wire opening 246 that allows for passage of wires to control the pitch of the blades.

Figure 15:
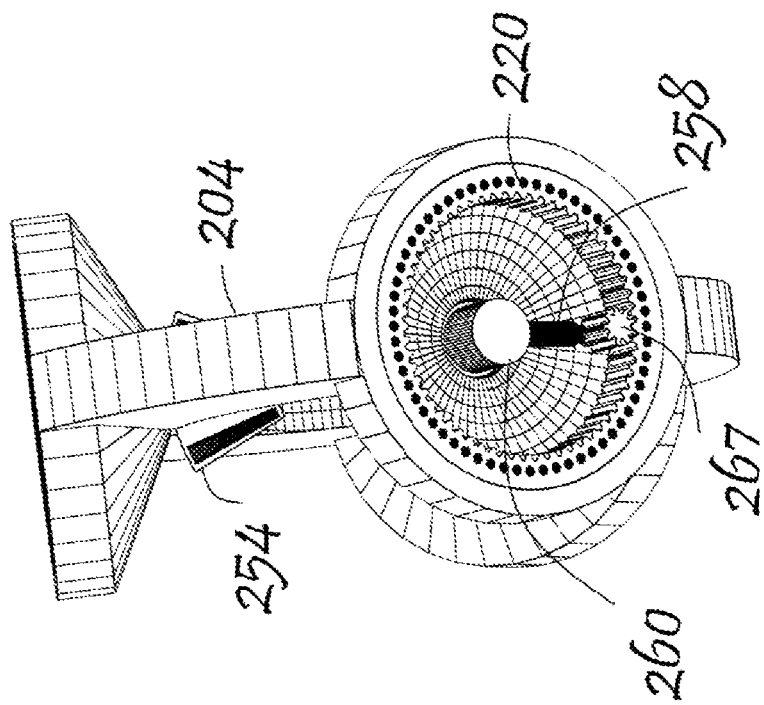
FIG. 14 and FIG. 15 show front and side views, respectively, of the hub socket, blade connector, and pitch motor gear after rotating the hub socket around the x and y axes for the preferred embodiment of the present invention.
Figure 14:
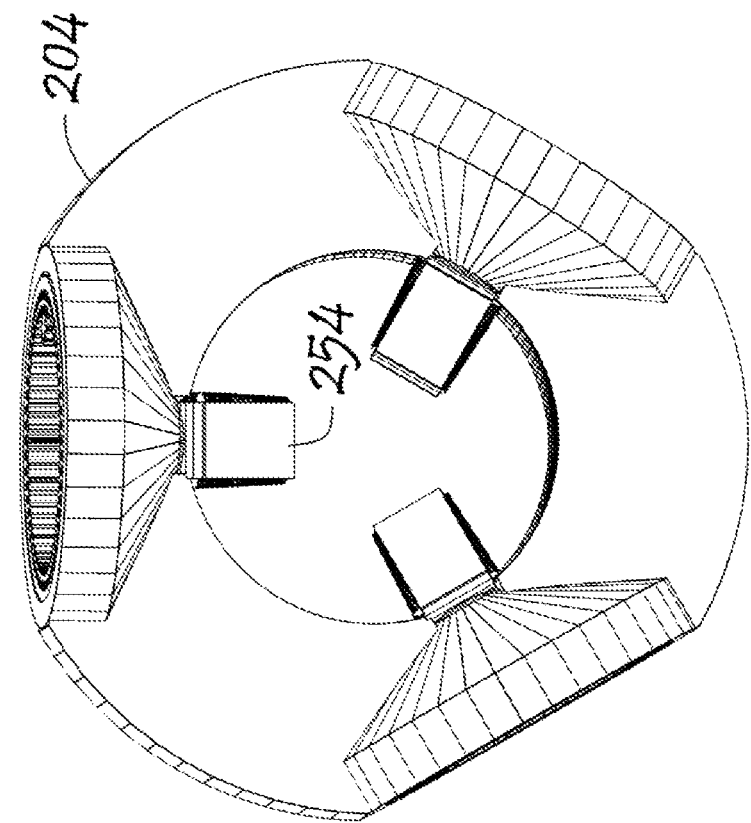

FIG. 14 and FIG. 15 show front and side images of the hub socket 204, blade connector 220, and pitch motor gear 267 after rotating the hub socket around the x-axis (7°) and y-axis (5°). These rotations around the x-axis and y-axis lead to teetering angles for blades 1:2:3 equal to 7.00°:−7.83°:0.83°. During these rotations, the independent transfer assemblies 260 remain aligned along the z-axis as seen by examining the alignment of the groove fittings 254 in FIG. 14. The rotations around the x and y axes cause the orientation of the hub socket 204 to rotate out of the x-y plane as seen by a side view in FIG. 15. The independent transfer assemblies 260, however, do not follow the rotation of the hub socket out of the x-y plane as seen by the orientation of the pitch motor support 258 which remains perpendicular to the z-axis. Since the pitch motor gear 267 meshes with the gears of the blade connector 220, the blade connector and blades also remain aligned along the z-axis so that rotations around the x-axis and y-axis do not change the pitch angle of the blades in the preferred embodiment of the present invention.

Another approach to the design of dynamic rotational couplers is depicted in FIG. 16 and FIG. 17. In this second preferred embodiment, rotational transfer operates by means of dynamic rotational couplers comprised of coupling rods and longitudinal grooves. FIG. 16 illustrates the main shaft ball 202 and the main shaft 112. In an example of this second preferred embodiment, there are four blades, eight longitudinal grooves 232, and eight coupling rods 234 (FIG. 17). The longitudinal grooves 232 are uniformly equatorially distributed in relation to the z-axis. In order to enable smooth movement through the longitudinal grooves, each coupling rod can be fitted with a single roller bearing as shown in 262 of FIG. 7. FIG. 17 illustrates the hub socket 204 and outer hub 205. The hub socket 204 comprises an inner socket surface 208 and an outer socket surface 210. The inner socket surface 208 is a portion of the surface of a sphere having a slightly greater diameter than that of the main shaft ball 202 (FIG. 16), which it slidably surrounds. A series of coupling rods 234 extend from the inner socket surface 208 and fit within the longitudinal grooves 232 (FIG. 16) of the main shaft ball 202 (FIG. 16). The outer hub 205, which is positioned on the outer socket surface 210, is comprised of multiple annular cylindrical socket extensions 216, multiple pitch adjustment rings 218 that can be rotated to change the pitch of the blades 110, and multiple blade connectors 220. Together the longitudinal groove 232 and a coupling rod 234 comprise a dynamic rotational coupler. The dynamic rotational couplers couple the hub socket 204 with the main shaft ball 202 (FIG. 16) during rotation of the rotor 106, while at the same time enabling back-and-forth rotation of the hub socket 204 with respect to the main shaft ball 202. A key difference between the second preferred embodiment and the preferred embodiment is the lack of an independent transfer assembly in the second preferred embodiment. It would be possible to modify the hub socket 204 by including an independent transfer assembly 260 (FIG. 6).

Figure 23:
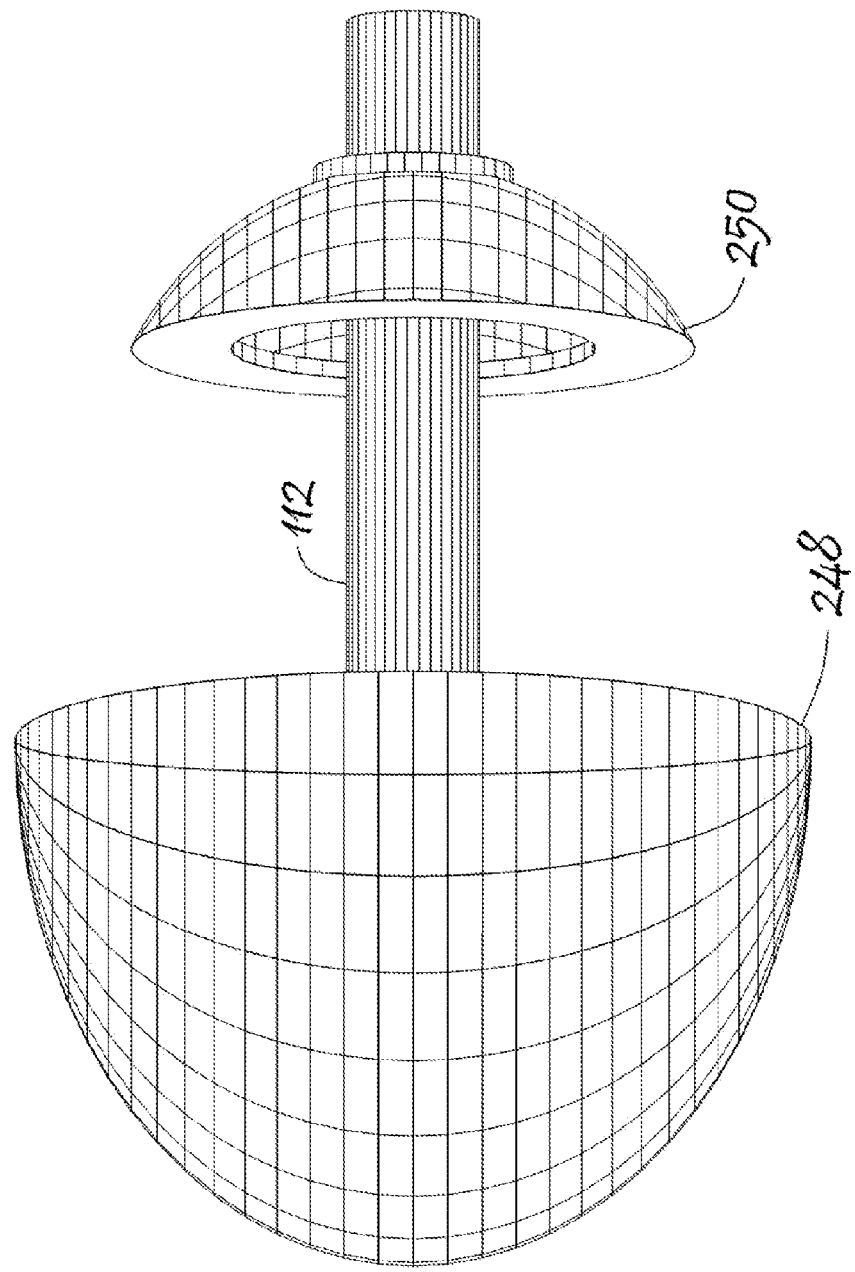
FIG. 23 is a side view of design 2 the optional nose cone and the inner hub protector with the hub removed for clarity.

FIG. 17 shows the ends of the coupling rods 234 are generally cylindrical and FIG. 17 shows the coupling rods 234 are affixed to the hub socket. Because of this, the dynamic rotational couplers will remain aligned with the hub socket and rotation of the hub socket 204 around the $x_a$ and $y_a$ axes will cause a change in the pitch angle of the blades in the second preferred embodiment of the present invention. A consequence of using hub-socket aligned dynamic rotational couplers is that the orientation of the hub socket will determine the orientation of all blades. This enables the hub socket 204 to have an axis of rotation that differs from the axis of rotation of the main shaft. FIG. 18 shows a side view of the coupling rods 234 of the hub socket 204 positioned within the longitudinal grooves 232 of the main shaft ball 202. In this view, the coupling rods 234 have been rotated 20° about the y-axis. Since the coupling rods, hub socket, and blades move together, the hub socket and blades will also be rotated 20° about the y-axis. It is possible to maintain desired rotations about the x and y axes and consequently a desired orientation of the rotor hub by contacting the back of the rotor along the x and y axes using linear actuators as shown in FIG. 23.

An exemplary embodiment of the present invention shows another approach to the design of dynamic rotational couplers as depicted in FIG. 19 and FIG. 20. In this exemplary embodiment, the rotational transfer means operate in the same way as the second preferred embodiment except that the locations of the coupling rods and longitudinal grooves are reversed. FIG. 19 illustrates the configuration of the main shaft ball 202 and the main shaft 112 in the exemplary embodiment of the present invention. The coupling rods 224 are uniformly equatorially distributed on the main shaft ball 202. FIG. 20 depicts a configuration of the hub socket 204 with two blades. The longitudinal socket grooves 226 are uniformly equatorially distributed in relation to the z-axis when the hub socket is perpendicular to the z-axis. The coupling rods 224 (FIG. 19) fit within the longitudinal socket grooves 226 in hub socket 204. The longitudinal socket grooves 226 and the coupling rods 224 (FIG. 19) together comprise a dynamic rotational coupler which enables transfer of rotational torque from the hub socket 204 to the main shaft ball 202. As with the second preferred embodiment, the rotational couplers remain aligned with the hub socket.

Figure 25:
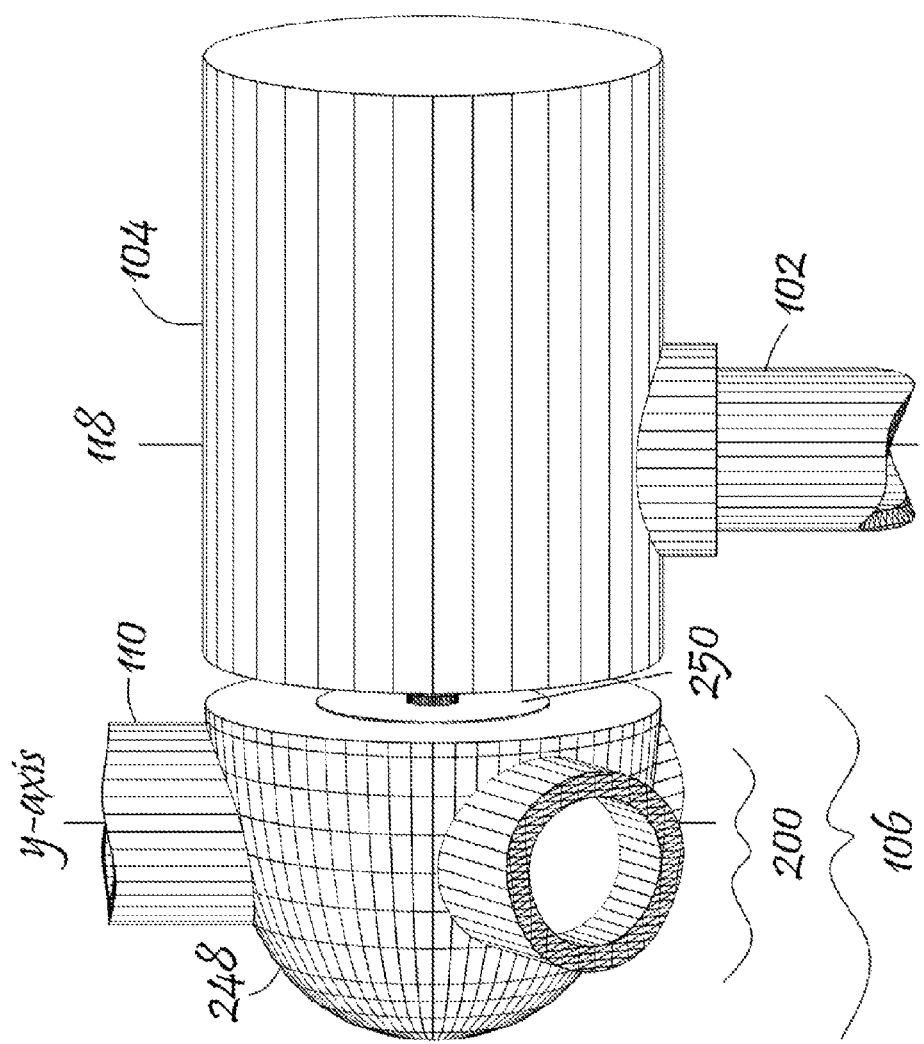
FIG. 25 is a side view of the rotor, the nacelle and the tower.

Optional features of all embodiments include a nose cone 248 and an inner hub protector 250. The design of the nose cone and inner hub protector would vary depending on the design of the hub. FIG. 21 shows a side view of design 1 of the nose cone 248 and the inner hub protector 250 that would be suitable for attachment to the hub socket shown in FIG. 4. In FIG. 21, the inner hub protector 250 is separated from the nose cone 248 for clarity. The inner hub protector 250 is attached to the main shaft 112. FIG. 22 shows a view of the back of the nose cone without the inner hub protector. The figure shows a back surface 300 that is flat and circular and extends from the outside perimeter of the nose cone to a circular opening in the center. The inner hub protector 250 (FIG. 21) is affixed to the back surface 300. FIG. 22 also shows a cylindrical support 302 that aligns with and is affixed to the outside perimeter of the hub socket housing connectors 272 (FIG. 10). The nose cone 248 and inner hub protector 250 together create a seal that protects the ball and socket from the environment. Connection of the nose cone 248 and the inner hub protector is shown in FIG. 25. FIG. 23 shows design 2 of a nose cone 248 and inner hub protector 250 that would be suitable for the hub socket shown in FIG. 17 and FIG. 20. The inner hub protector 250 is constructed of a flexible material (e.g., rubber) that allows for movement of the hub socket 204 with respect to the main shaft 112, as shown in FIG. 26 and FIG. 27. A seal that protects the ball-and-socket hub from the environment would most likely be used in dusty and/or aqueous environments.

Figure 24:
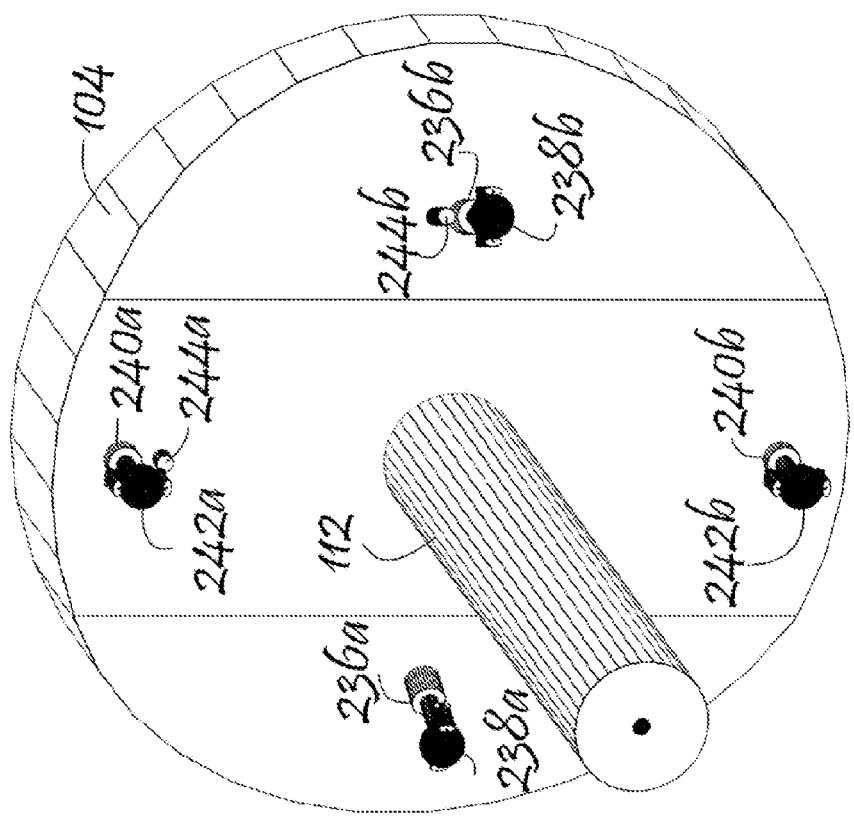
FIG. 24 is a perspective view of the front of the nacelle with the back portion removed for clarity.

For any of the embodiments, FIG. 24 shows the front of the nacelle 104 with the back portion removed for clarity. The figure shows the main shaft 112 extending forward. The figure shows the ends of two horizontal linear actuators 236a and 236b that are positioned along the x-axis within the nacelle 104. A horizontal wheel is located at the end of each horizontal linear actuator, 238a and 238b. The figure also shows the ends of two vertical linear actuators 240a and 240b that are positioned along the y-axis within the nacelle 104 with a vertical wheel located at the end of each vertical linear actuator, 242a and 242b. FIG. 24 also shows the end of a vertical laser measuring device 244a positioned along the y-axis and the end of a horizontal laser measuring device 244b positioned along the x-axis. The laser measuring devices 244a 244b read the distances to the back of the hub 200 and relay these measurements into a microprocessor 126 (FIG. 2) to determine the plane of rotation of the hub 200. Based upon this information, the microprocessor 126 can change the plane of rotation by sending a signal to extend one or more of the linear actuators 236a 236b 240a 240b so as to push the back of the hub 200 with the wheels 238a 238b 242a 242b until the desired plane of rotation is achieved. It is expected that control of the desired plane of rotation would be used primarily with a hub equipped with dynamic rotation couplers that align with the hub socket. In this configuration as shown in FIG. 26 and FIG. 27, the hub and blades are all oriented in the desired orientation. The linear actuators 236a 236b 240a 240b also provide a stop for the movement of the hub socket 204 within the desired range of motion. The linear actuators 236a 236b 240a 240b can also be used during start up and shut down in order to assure that the blades 110 do not strike the tower 102 or nacelle 104. In this case, all linear actuators 236a 236b 240a 240b would be extended fully to position the hub socket 204 perpendicular to the main shaft 112. After startup, the linear actuators 236a 236b 240a 240b can be moved back to avoid unnecessary contact of the wheels 238a 238b 242a 242b with the back surface of the hub 200.

FIG. 25, which is a side view of any of the preferred embodiments, shows the vertical cylindrical tower 102, a horizontal nacelle 104 and a rotor 106. The rotor 106 comprises a ball-and-socket hub 200, from which extend two or more blades 110, a nose cone 248, and a flexible inner hub protector 250 from design 1. The nacelle 104 is mounted on a tower 102 that can be rotated around the yaw axis 118. FIG. 25 shows the y-axis which is parallel to the yaw axis 118. The figure does not include optional linear actuators.

FIG. 26 and FIG. 27 show two views of the top of the apparatus along with the x-axis and the z-axis. The figure shows design 2 of the nose cone 248 and an inner hub protector 250 and usage of linear actuators. FIG. 26 shows an alignment of the rotor 106 with the z-axis. FIG. 27 shows a view where the rotor axis 222 is rotated 20° around the y-axis. FIG. 26 and FIG. 27 show the front of the nacelle 104 is angled with respect to the z-axis in order to accommodate rotation of the hub socket 204 around the y-axis. FIG. 27 shows contact with the hub socket 204 with the horizontal wheel 238b of the horizontal linear actuator 236b. The actuator 236b stops the hub 204 from rotating further in order to avoid damage to the nacelle 104. FIG. 27 shows the rotor 106 maintains symmetry with respect to the rotor axis 222 after rotating that axis 20° around the y-axis. The rotor 106 also maintains symmetry with respect to the z-axis because the z-axis and the rotor axis 222 intersect at the y-axis.

Although the preferred embodiments of the present invention have been disclosed for illustrative purposes, those skilled in the art will appreciate that many additions, modifications and substitutions are possible, without departing from the scope and spirit of the present invention as defined by the accompanying claims. The accompanying claims are limited to applications in air, although these claims are equally valid to applications in water.

Computer Modeling of Performance

In order to assess the performance of enabling teetering for three-bladed turbines, computer modeling was performed by modifying FAST, the wind turbine modeling software available from National Renewable Energy Laboratory[1]. The present FAST software code can model turbines with two or three blades. Two bladed turbines can be modeled with teetering either enabled or disabled, whereas three bladed turbines do not permit teetering. The present code enables teetering of two bladed turbines by having a degree of freedom (tDOFx$_a$) to balance differences in out-of-plane torque about the x$_a$ axis. The x$_a$ axis is a rotating axis used by the code that is perpendicular to the pitch axes of blades 1 and 2. The code was modified by enabling tDOFx$_a$ for three bladed turbines which allows for out-of-plane rotation of the rotor about the x$_a$ axis. The code was further modified by enabling an additional degree of freedom (tDOFy$_a$). This permits three bladed turbines to balance differences in out-of-plane torque about the y$_a$ axis. The orientations of x$_a$ and y$_a$ axes for three bladed turbines are shown in FIG. 3. The source code could also be modified by enabling rotations about any other fixed or stationary perpendicular axes in the xy plane (e.g., x and y axes). The out-of-plane rotations of the rotor about the x$_a$ and y$_a$ axes are designated Tx$_a$ and Ty$_a$, and these rotations can be used to determine the teetering deflections for blades 1, 2 and 3 according to the following equations:

$$\text{Teeter Deflection Blade 1} = \sin(90°)*Tx_a + \cos(90°)*Ty_a \quad \text{Eq. 1}$$

$$\text{Teeter Deflection Blade 2} = \sin(330°)*Tx_a + \cos(330°)*Ty_a \quad \text{Eq. 2}$$

$$\text{Teeter Deflection Blade 3} = \sin(210°)*Tx_a + \cos(210°)*Ty_a, \quad \text{Eq. 3}$$

where blades 1, 2 and 3 are positioned at 90°, 330° and 210°, respectively.

Summing the above equations for the teeter deflections of blades 1, 2 and 3 gives a value of zero. Although three blades teeter, there are only two degrees of freedom since subtracting the teetering angles of any two blades from zero determines the teetering angle of the remaining blade. Additionally, the teetering velocity or acceleration for each blade can be determined by replacing Tx$_a$ and Ty$_a$ with the rotational velocities or rotational accelerations about the x$_a$ and y$_a$ axes into the above equations.

Computer modeling was done using the NREL 5-MW[2] and 1.5-MW[1] baseline wind turbines. These hypothetical wind turbines are conventional three-bladed upwind turbines with pitch control. Modeling for the 5-MW turbine was performed under moderate, severe and extreme wind conditions using the onshore configuration. Turbsim[3] (available from NREL) was used to generate wind profiles 1-4 with some of the conditions presented in Table I. The WF_07D turbulence model takes into account wind shadow from neighboring turbines spaced seven rotor diameters apart. Modeling also took into account tower shadow, where the tower reduces the effective wind speed of a blade passing in front. Table I summarizes the turbine parameters and wind conditions for setups 1-4:

TABLE I

| Wind Turbine Parameters and Wind Conditions | | | | |
|---|---|---|---|---|
| Parameter | Setup 1 | Setup 2 | Setup 3 | Setup 4 |
| Turbine Rated Power | | 5 MW | | 1.5 MW |
| Rotor Diameter/Hub Height | | 120 m/90 m | | 70 m/84 m |
| Yaw Control | no | no | No | yes |
| Pitch Control | no | yes | Yes | yes |
| Wind Profile Designation | moderate | severe | Extreme | moderate |
| Mean Wind Speed (m/s) | 11 | 20 | 30 | 11 |
| Wind Speed x Direction (m/s) | −7.6-7.0 | −10.1-11.5 | −14.7-15.7 | −7.8-7.5 |
| Wind Speed y Direction (m/s) | −5.7-6.0 | −9.0-9.9 | −11.6-10.6 | −5.3-6.3 |
| Wind Speed z direction (m/s) | 5.1-15.4 | 11.8-27.5 | 19.3-43.3 | 4.6-15.7 |
| Horizontal Wind Direction | −52.0°-34.4° | −32.5°-32.6° | −31.2°-28.0° | −55.7°-36.5° |
| Vertical Wind Direction | −25.9°-38.2° | −25.5°-27.9° | −21.1-25.5° | −22.4°-38.8° |
| Nacelle Yaw Error | −52.0°-34.4° | −32.5°-32.6° | −31.2°-28.0° | −40.5°-41.1° |
| Turbulence Model | | WF-07D | | WF-07D |
| Turbulence Characteristic | | A | | A |
| IEC Wind Type | normal | extreme | 50-year extreme | normal |
| IEC Wind Turbine Class | | 1 | | 1 |

Changes in yaw angle were made in setup 4 using a routine where yaw angle was changed at a maximum rate of ±0.2 deg/sec in response to changes in wind direction. Changes in pitch angle were made in setups 1, 2 and 3 in order to limit power output to 5 MW using discon.dll, a pitch control routine developed at NREL[2]. The discon.dll routine does not enable changes in yaw angle. Power was limited when necessary by increasing the pitch angle with increasing wind speed. An increase in pitch angle results in a decrease in the angle of attack and a corresponding decrease in lift and power generation. Setup 1 was chosen for comparison of loads to evaluate differences in the hubs under typical conditions. Setups 2, 3, and 4 were used exclusively for examination of teetering.

The FAST program provides for a number of performance measures, which are quantitated in the output parameters related to the power generation as well as the loads on the blades, main shaft, bearings and tower. Visual comparison of plots of these output parameters shows that a three-bladed turbine equipped with a ball-and-socket hub shows significant improvements in some performance measures in comparison to a three-bladed turbine with a fixed hub. In addition, visual comparison shows significant improvements in other performance measures when comparison is made to a teetering, two-bladed turbine. There were no performance measures observed where either the fixed hub or the teetering, two-bladed hub provided significantly better performance than the three-bladed, ball-and-socket hub, except when teetering caused a change in the pitch angle as described below. All setups showed results comparable to the setup used for illustration.

As previously noted, the ball-and-socket can be equipped with main-shaft aligned dynamic rotation couplers or hub-socket aligned dynamic rotational couplers. Blades attached to hubs equipped with main-shaft aligned rotational couplers are also aligned with the main shaft and blades attached to hub with hub-socket aligned rotational couplers are also aligned with the hub socket. In this study, setup 1 was modified by not using pitch control. Here the pitch angle was maintained at 0° to simulate blades aligned with the main shaft or changed at each time step to simulate use of blades aligned with the hub sockets. The pitch angle changes for Blades 1-3, were determined by subtracting 90° from all the angles in Equations 1-3 to give the following:

Pitch Angle Change Blade 1=sin(0°)*$Tx_a$+cos(0°)*$Ty_a$   Eq. 4

Pitch Angle Change Blade 2=sin(240°)*$Tx_a$+cos(240°)*$Ty_a$   Eq. 5

Pitch Angle Change Blade 3=sin(120°)*$Tx_a$+cos(120°)*$Ty_a$   Eq. 6

Initial modeling of blades aligned with the hub socket showed an ever-increasing teetering angle, indicating a fundamental instability occurs when teetering and pitch angle are which linked. In order to stabilize the teetering and investigate the impact upon performance measures, the pitch angle changes of all blades were multiplied by 0.9. FIG. 28 shows the power output of a wind turbine equipped with a ball-and-socket hub where blades were aligned with the main shaft and FIG. 29 shows the power output under the same conditions where blades were aligned with the hub socket. The figures show that significant spikes in power output occur when blades are aligned with the hub socket and teetering causes changes in pitch angle. Other performance measures also showed a very negative impact when teetering caused a change in pitch angle. Based upon this, it would be necessary to actively counter the change in pitch angle caused by teetering with an opposite change in the pitch angle using the pitch control motor. In all remaining modeling, it is assumed that the ball-and-socket hubs are equipped with main-shaft aligned rotational couplers or in cases with hub-aligned dynamic rotational couplers, active pitch control is used to counter the changes in pitch angle caused by teetering.

Figure 33:
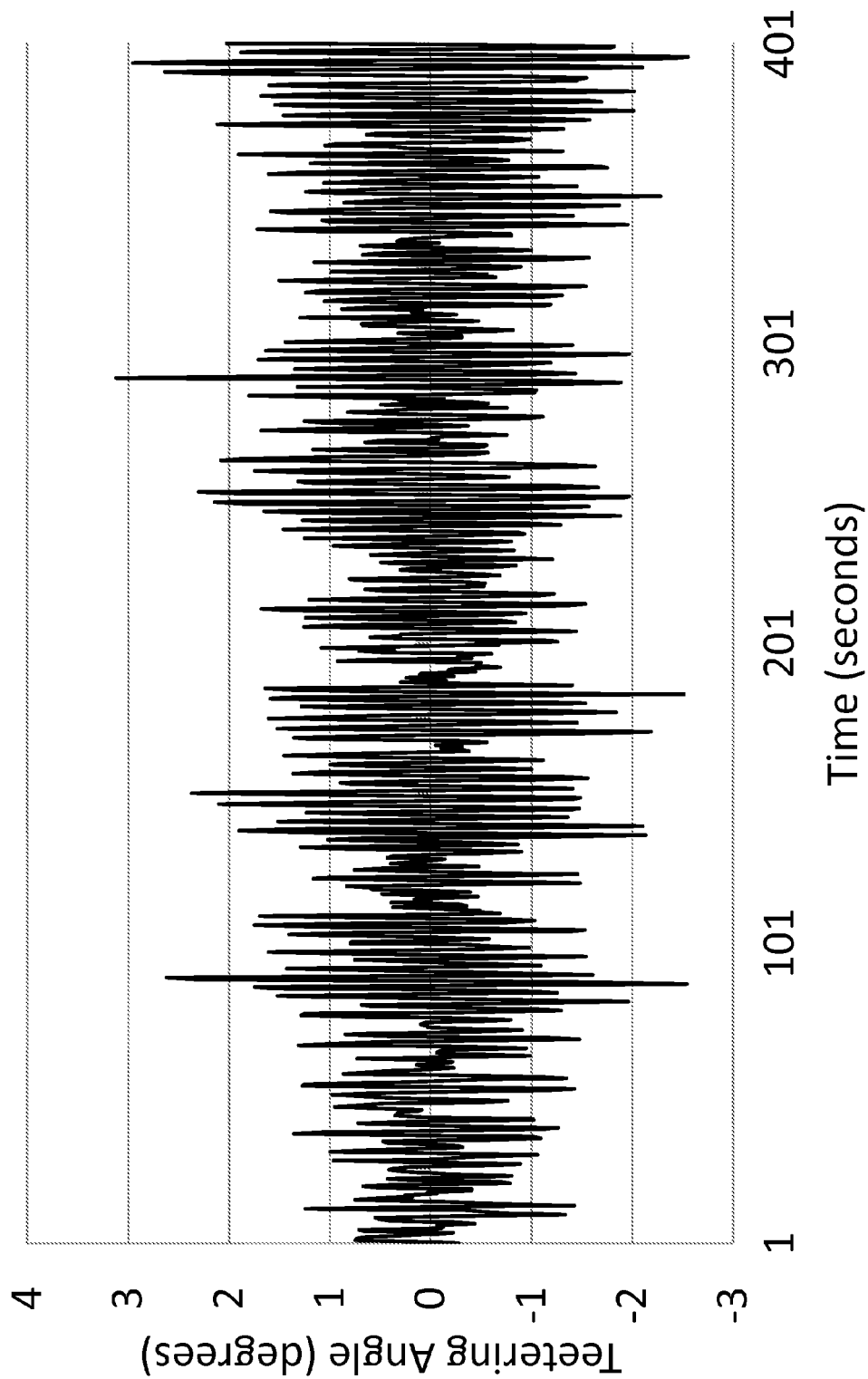

The modeling results presented are designed to determine if teetering is applicable to large wind turbines, and if so, highlight differences between the fixed and ball-and-socket hubs. A significant purpose for modeling is to determine if teetering can be used with very large wind turbines under moderate and even extreme wind conditions. FIG. 30 shows the teetering deflection of blade 1 with the moderate wind profile using setup 1 has an approximate range of ±5°. FIG. 31 shows the teetering deflection of blade 2 with the severe wind profile has an approximate range of ±6° and FIG. 32 shows teetering of blade 3 in an extreme wind profile has an approximate range of ±9°. Finally, a fourth study was done using setup 4 where a 1.5-MW wind turbine was modeled using the moderate wind profile and results provided in FIG. 33 show teetering of blade 1 is ±3°. Overall, results show that teetering is stable and not-excessive and that it can be used with large wind turbines, assuming resonant teetering is not a significant factor.

Comparison to Three-Bladed Turbine with Fixed Hub

Modeling was done to compare a three-bladed turbine with a ball-and-socket hub to a three bladed turbine with a fixed hub using setup 1. This setup was chosen in order to make comparisons under the most typical conditions, although all setups show generally equivalent comparisons. Modeling shows the two hubs are generally comparable in power generation and in output parameters that are based upon in-plane forces. FIG. 34 and FIG. 35 show a comparison of generator power profiles between the two hubs. The modeling shows a slight advantage for the fixed hub in cases when the power output is less than 5 MW.

Modeling shows substantial benefits in output parameters associated with out-of-plane rotation of the hub around the $x_a$ and $y_a$ axes. Enabling these rotations effectively balances all out-of-plane torque applied by the rotor. When torque is unbalanced (as with fixed hub turbines), the rotor exerts a bending moment on the main shaft tip about both the $x_a$ and $y_a$ axes. FIG. 36 shows very significant torque applied to the shaft tip with a fixed hub turbine about the $x_a$ axis. In contrast, FIG. 37 shows that a ball-and-socket hub does not apply any bending torque to the main shaft tip about the $x_a$ axis. Similarly, FIG. 38 shows a fixed hub exhibits a significant bending moment on the main shaft tip about the $y_a$ axis whereas a ball-and-socket hub exerts no bending torque about the same axis as shown in FIG. 39. It would be expected that the ball-and-socket hub would not exert a bending torque about the $x_a$ and $y_a$ axes because there is no means for transferring this torque as long as teetering is not constrained.

A direct result of the balancing of out-of-plane torque is a significant reduction in stresses applied to the main shaft bearing. The main shaft is referred to as the low speed shaft in the FAST modeling. FIG. 40 and FIG. 41 show a comparison of the main shaft gauge load about the stationary x-axis. The figures show the gauge load applied by the rotor of a fixed hub turbine varies considerably and is significant at the extremes. In contrast, the gauge load applied by the rotor of a ball-and-socket hub is relatively constant at ca. −2000 kilo Newton meters (kN·m). This torque about the x-axis is caused by cantilevering of the rotor mass in front of the gauge monitor. FIG. 42 and FIG. 43 show the same trend, however the gauge load about the stationary y-axis is not affected by the mass of the rotor. A rotor equipped with a ball-and-socket hub shows an approximate torque of 0 kN·m with very small variability, whereas a rotor equipped with a fixed hub shows significant variability and at times very significant positive and negative loads. Since the main shaft bearing is within the vicinity of the main shaft gauge monitor, modeling results shows the main shaft bearing(s) would experience far less stress loads with the ball-and-socket hub.

Modeling shows the ball-and-socket hub reduces the variability in the out-of-plane (about x and y axes) moment applied to the blade root as shown in FIG. 44 and FIG. 45. The two hubs show approximately the same average out-of-plane (OOP) moment, however the fixed hub shows considerably more cyclic variability. To assess whether the added variability is associated with azimuth angle, a plot of tower clearance (adjusted to fit on graphs) was added to both figures. The tower clearance plot shows a minimum value when the blade faces down and passes the tower. Results show the negative spikes in the out-of-plane moment for a fixed hub occur as the blade passes in front of the tower. These spikes do not occur with ball-and-socket hub, demonstrating that the teetering enabled by the ball-and-socket hub largely eliminates the impact of tower shadow upon the blades. It is likely that the impact of wind shadow from neighboring is similarly reduced with ball-and-socket hubs. FIG. 46 and FIG. 47 show greater variability in OOP tip deflection for a fixed hub than with a ball-and-socket hub.

FIG. 48 and FIG. 49 show the ball-and-socket hub provides for very significant reductions in tower top yaw bearing yaw moment. FIG. 50 and FIG. 51 show similar, very significant reductions in tower top pitch moment. Based upon this modeling, it is expected that the yaw bearing would be subject to significantly lower loads with a ball-and-socket hub. Not shown are similar very significant differences in tower base yaw moment and tower base pitch moments. An additional benefit in reducing the loads on the yaw bearing is that the energy necessary to rotate the Nacelle and rotors will be less variable. It would still be necessary to provide substantial torque to counter the mass of the Nacelle and the mass and gyroscopic forces of the rotor, however the yaw motor(s) would no longer have to counter the very substantial yaw bearing moment when this torque opposes the desired rotation. Because of this, it is likely that the energy necessary to rotate the Nacelle and rotor will be reduced.

Comparison to Two-Bladed Turbine with Teetering Hub

Modeling was done to compare a three-bladed turbine with a ball-and-socket hub to a two-bladed turbine with a teetering hub using setup 1 in order to make comparisons under the most typical conditions. In order to create the two-bladed turbine, the chord lengths and mass of each blade were multiplied by 1.5.

Figure 52:
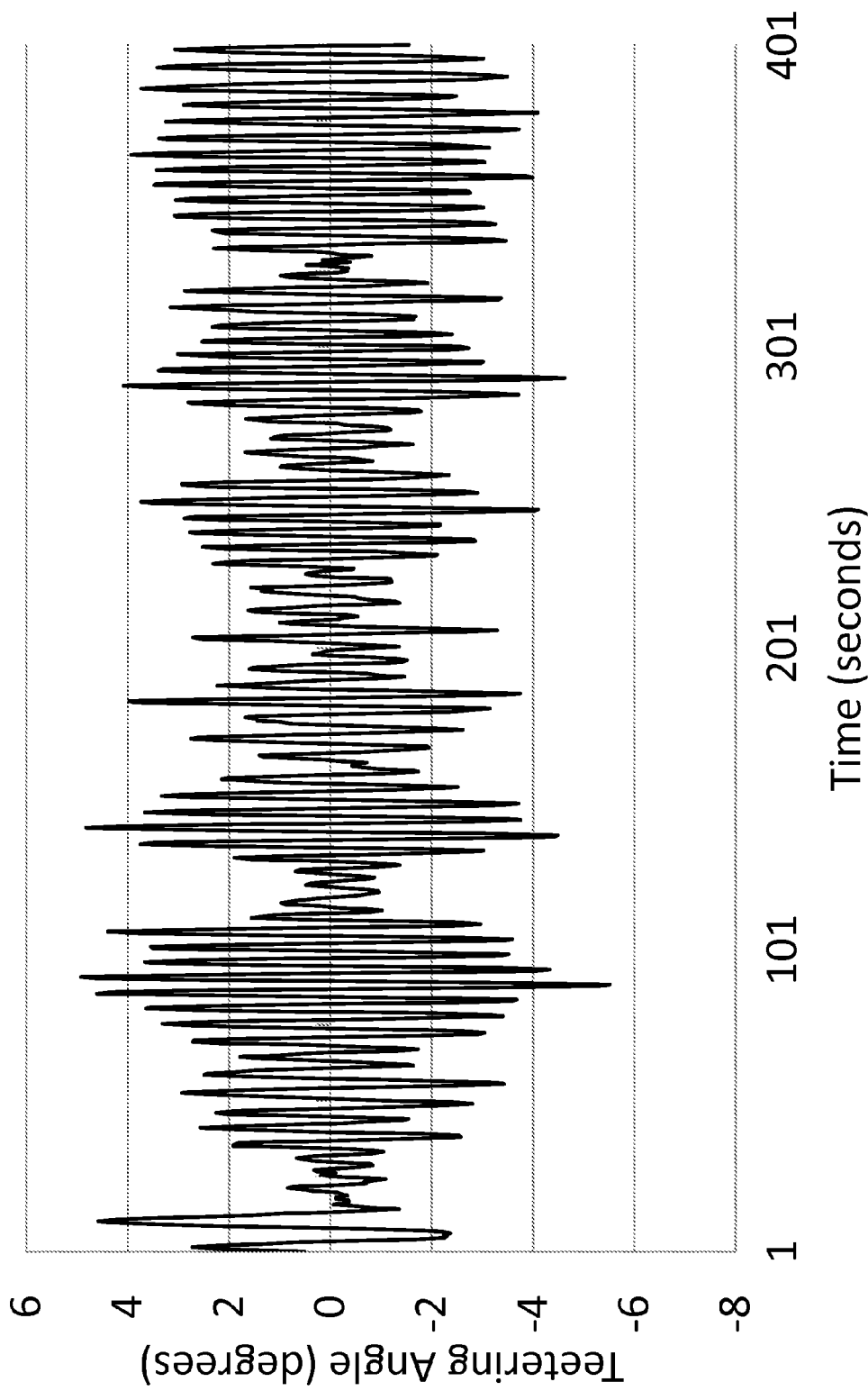

FIG. 52 shows the teetering profile for blade 1 of a two-bladed turbine. Comparison with FIG. 30 shows approximately the same teetering profile for blade 1 of a three-bladed turbine with a ball-and-socket hub. Additionally, the same approximate profiles were seen for Setups 2-4. Many of the same benefits that are enabled by teetering with a ball-and-socket hub are also realized by a teetering, two-bladed turbine. Examples include significant reductions in the bending moments at the shaft tip, the main shaft gauge loads, and the tower top yaw bearing yaw and pitch moments.

The three-bladed turbine with a ball-and-socket hub, however does provide significant advantages over a two-bladed, teetering hub in reduced loads on the blades. This is primarily because a single blade in a two-bladed turbine generates one-half the total lift, whereas a single blade in a three-bladed turbine generates one-third. FIG. 53 shows an example where the out-of-plane moment at the blade root is approximately 1.5 greater for a blade attached to a two-bladed turbine.

Figure 55:
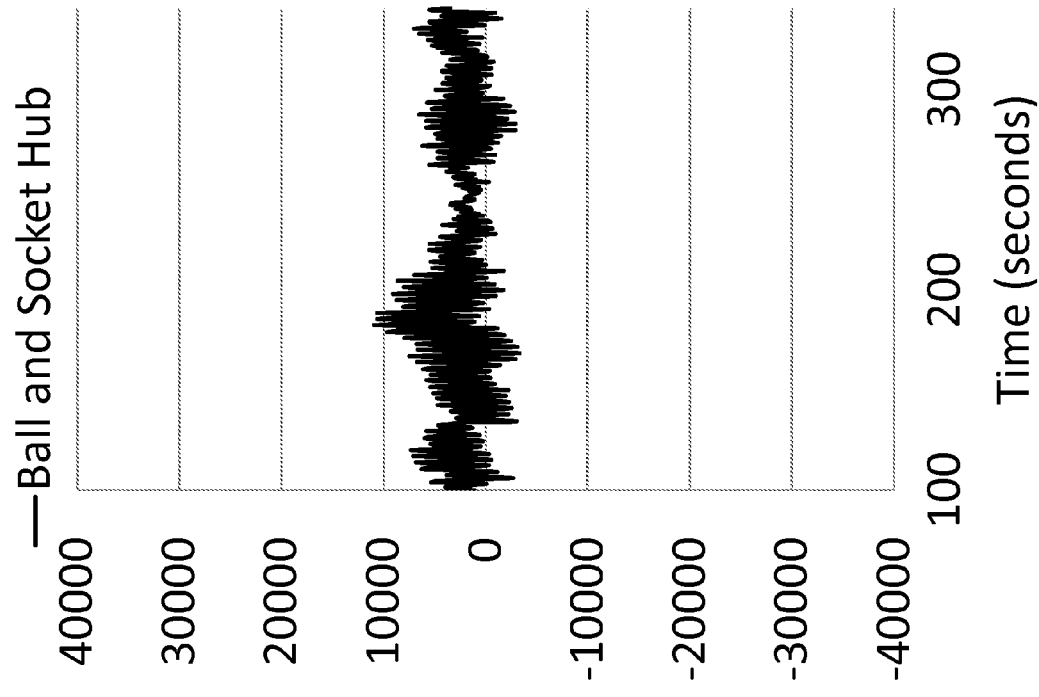
Figure 54:
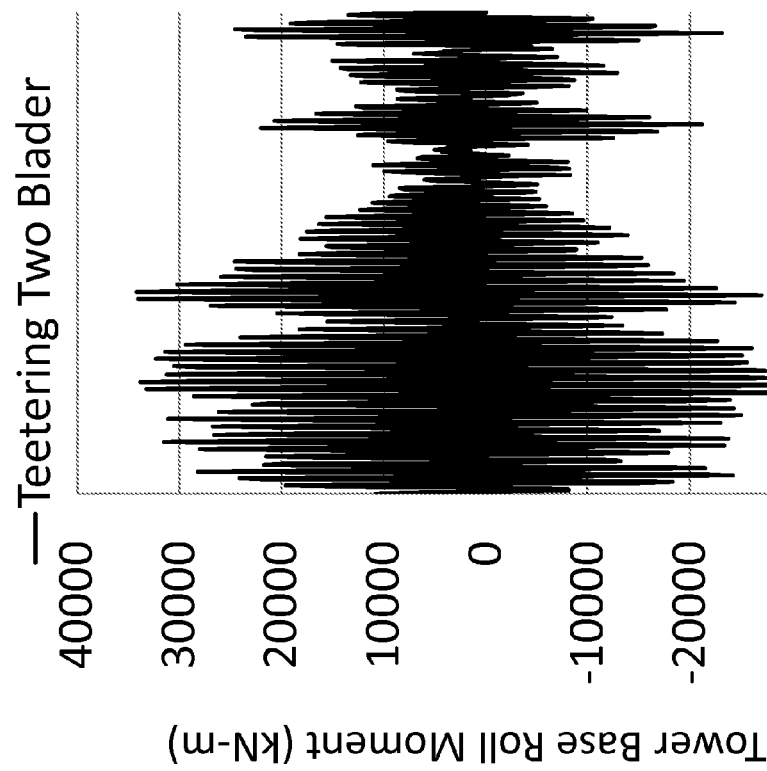
Figure 57:
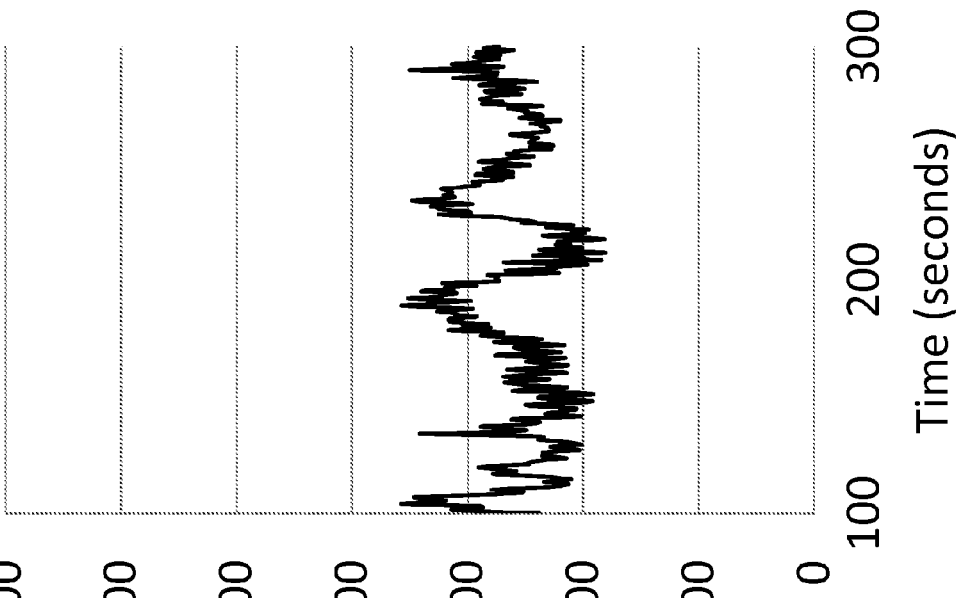
Figure 56:
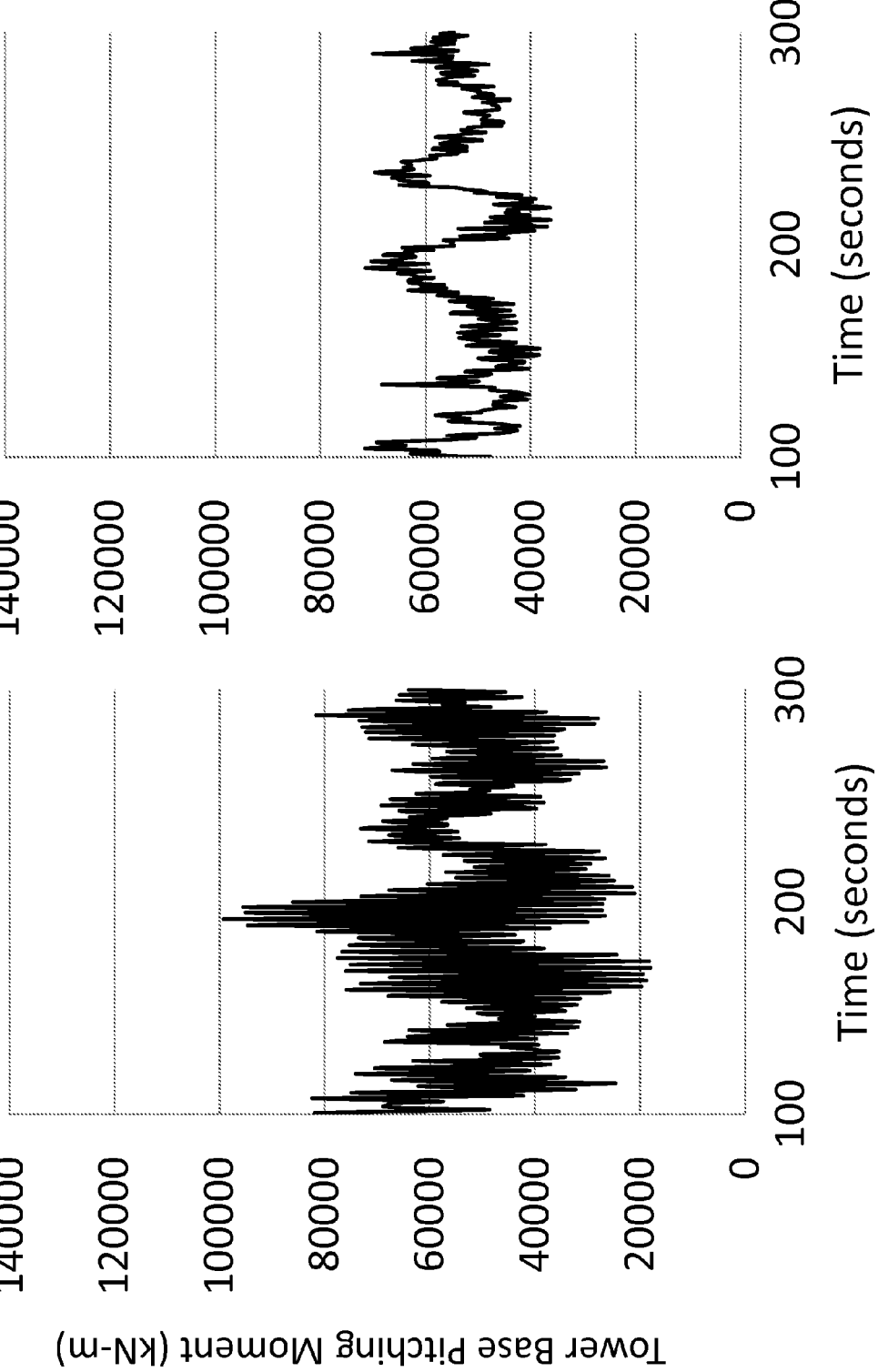

Other advantages of a three-bladed, ball-and-socket turbine are shown with a comparison of torque exerted on the tower. FIG. 54 and FIG. 55 show a very significant reduction in the tower base roll moment and FIG. 56 and FIG. 57 show a significant reduction in the tower base pitching moment for a three-bladed turbine with a ball-and-socket hub. It is possible that resonant teetering contributes to the significant amplitude in tower base roll and tower base pitching moments for a two-bladed teetering turbine.

The current hub designs of a fixed hub with three blades and a teetering hub with two blades each have advantages over the other in reducing loads on the blades, tower, main shaft and bearings. The advantages of a fixed hub with three blades are primarily due to the additional blade and the advantages of the two-bladed teetering hub are primarily due to teetering. Modeling results show the advantages of the fixed hub with three blades and the advantages of the teetering hub with two blades are combined with a ball-and-socket hub that enables teetering of three blades. As a result, a ball-and-socket hub equipped with three blades shows advantages over both current hub designs in reducing stresses on the blades, tower, main shaft, and bearings.

REFERENCES

[1] Jonkman, J.; Buhl, M. FAST User's Guide. NREL/TP-500-38230. Golden, Colo.: National Renewable Energy Laboratory, October 2005.
[2] Jonkman, J. Dynamics Modeling and Loads Analysis of an Offshore Floating Wind Turbine. NREL/TP-500-41958. Golden, Colo.: National Renewable Energy Laboratory, November 2007.
[3] Jonkman, B.; Buhl Jr., M. L. TurbSim User's Guide for Version 1.40. Golden, Colo.: National Renewable Energy Laboratory, September 2008.

What is claimed is:

1. A horizontal axis wind turbine generator comprising:
a horizontal nacelle supported by a tower;
a plurality of turbine blades; and
a ball-and-socket hub arranged external to the nacelle and arranged at an end of a main shaft configured to transmit kinetic energy to be received by an electric generator in the nacelle, wherein the ball-and-socket hub comprises:
a main shaft ball element affixed to the end of the main shaft such that a center of the main shaft ball element can be intersected by a main shaft axis and perpendicular $x_a$ and $y_a$ axes, wherein at least a portion of the ball element comprises a spherical shape;
a hub socket that surrounds a portion of the main shaft ball element;
a plurality of blade connectors coupled with the hub socket and arranged to connect to the plurality of turbine blades; and
a plurality of dynamic rotational couplers, the plurality of dynamic rotational couplers comprising (A) a plurality of longitudinal grooves defined in one of (i) the main shaft ball element and (ii) the hub socket; and (B) a plurality of sliding elements arranged generally perpendicular to the main shaft, arranged to fit into the plurality of longitudinal grooves, and associated with the other of (i) the main shaft ball element and (ii) the hub socket;
wherein the plurality of sliding elements are arranged to cooperate with the plurality of longitudinal grooves to permit the hub socket, the plurality of blade connectors, and the plurality of turbine blades to teeter in response to exposure to wind shear conditions.

2. The horizontal axis wind turbine generator of claim 1 wherein the plurality of longitudinal grooves is defined in an outer surface of the main shaft ball element and the plurality of sliding elements extends from an inner surface of the hub socket.

3. The horizontal axis wind turbine generator of claim 1 wherein the plurality of longitudinal grooves is defined in an inner surface of the hub socket and the plurality of sliding elements extend from an outer surface of the main shaft ball element.

4. The horizontal axis wind turbine generator of claim 1 wherein:
   each longitudinal groove of the plurality of longitudinal grooves comprises elongated sides; and
   each sliding element of the plurality of sliding elements fits within a corresponding longitudinal groove of the plurality of longitudinal grooves and is in slidable contact with at least one of the elongated sides of the corresponding longitudinal groove.

5. The horizontal axis wind turbine generator of claim 1 further comprising a plurality of independent transfer assemblies associated with the plurality of blade connectors and housed within the hub socket, wherein each independent transfer assembly of the plurality of independent transfer assemblies comprises:
   a cylindrical coupling base that is oriented such that an axis of the cylindrical coupling base intersects the center of the main shaft ball element and is co-linear with a pitch axis of a turbine blade coupled to a blade connector associated with the independent transfer assembly; and
   a transfer bearing surrounding the cylindrical coupling base, the transfer bearing enabling the cylindrical coupling base to rotate within the hub socket about the axis of the cylindrical coupling base.

6. The horizontal axis wind turbine generator of claim 5 wherein the plurality of sliding elements comprises a plurality of groove fittings associated with the plurality of independent transfer assemblies, each groove fitting being affixed to an inner end of the cylindrical coupling base of the associated independent transfer assembly and fitting within a corresponding longitudinal groove defined in the main shaft ball element, with said groove fitting having two sides that are generally parallel to elongated sides of the corresponding longitudinal groove.

7. The horizontal axis wind turbine generator of claim 5 wherein, for each independent transfer assembly, an inner end of the cylindrical coupling base embodies a groove fitting that fits within a longitudinal groove of the plurality of longitudinal grooves defined in the main shaft ball element, with said groove fitting having two sides that are generally parallel to the two elongated sides of the longitudinal groove.

8. The horizontal axis wind turbine generator of claim 1 wherein the plurality of sliding elements comprises a plurality of groove fittings, and each groove fitting of the plurality of groove fittings comprises a plurality of bearings located on sides of the groove fitting promoting a smooth, slidable movement between the groove fitting and elongated sides of a corresponding longitudinal groove of the plurality of longitudinal grooves.

9. The horizontal axis wind turbine generator of claim 1 wherein the plurality of sliding elements comprises a plurality of groove fittings, and each longitudinal groove of the plurality of longitudinal grooves comprises a plurality of bearings located on elongated sides of the longitudinal groove promoting a smooth, slidable movement between the longitudinal groove and elongated sides of a corresponding groove fitting of the plurality of groove fittings.

10. The horizontal axis wind turbine generator of claim 1, arranged to maintain alignment with the main shaft, wherein:
   the plurality of longitudinal grooves is defined in the main shaft ball element; and
   the plurality of sliding elements comprises a plurality of groove fittings, wherein each groove fitting is positioned at an inner end of a cylindrical coupling base, wherein each groove fitting contacts a corresponding longitudinal groove either directly at a plurality of locations or indirectly through a plurality of bearings, with said contact preventing the groove fitting from rotating about an axis of the cylindrical coupling base within the longitudinal groove, and with said prevention of rotation serving to maintain alignment between the longitudinal groove and the main shaft while the groove fitting is moving within the longitudinal groove.

11. The horizontal axis wind turbine generator of claim 1, arranged to maintain alignment with the hub socket, wherein:
   the plurality of longitudinal grooves is defined in the main shaft ball element; and
   the plurality of sliding elements comprises a plurality of coupling rods, wherein each coupling rod of the plurality of coupling rods is affixed to the hub socket and has a generally cylindrical shape, and wherein the generally cylindrical shape enables the coupling rod to rotate around its axis while also moving back and forth within a corresponding longitudinal groove of the plurality of longitudinal grooves defined in the main shaft ball element.

12. The horizontal axis wind turbine generator of claim 1, arranged to maintain alignment with the hub socket, wherein:
   the plurality of longitudinal grooves is defined in the hub socket;
   the plurality of sliding elements comprises a plurality of coupling rods, wherein each coupling rod is affixed to the main shaft ball element and is aligned perpendicular to the main shaft axis and oriented in an x-y plane, where each coupling rod has a generally cylindrical shape and where the generally cylindrical shape enables the coupling rod to rotate around its axis while also moving within a corresponding longitudinal groove of the plurality of longitudinal grooves defined in the hub socket.

13. The horizontal axis wind turbine generator of claim 11, wherein each coupling rod comprises a rod-shaped bearing fitted over the coupling rod to enable smoother movement of the coupling rod within the corresponding longitudinal groove.

14. The horizontal axis wind turbine generator of claim 1 wherein each longitudinal groove of the plurality of longitudinal grooves includes soft stops located at terminal ends of the longitudinal groove.

15. The horizontal axis wind turbine generator of claim 1, further comprising:
   a nose cone attached to the hub socket; and
   an inner hub protector, wherein the inner hub protector fits over the main shaft and is attached to either the nose cone or a back surface of the hub socket.

16. The horizontal axis wind turbine generator of claim 15 wherein the inner hub protector is made of a flexible material that allows the hub socket to move with respect to the main shaft, and wherein the nose cone and the inner hub protector together create a seal that surrounds and protects the hub socket.

17. The horizontal axis wind turbine generator of claim 1, wherein the ball-and-socket hub is arranged proximate to a face of the nacelle, and the horizontal axis wind turbine generator further comprises multiple linear actuators and multiple laser measuring devices arranged on or in the face of the nacelle, wherein each linear actuator of the multiple linear actuators is arranged to permit extension or retraction of an associated wheel or a rotary member, and wherein the multiple laser measuring devices continuously monitor distances between the face of the nacelle and a back of the hub socket as embodying alignment data regarding a plane of rotation of the hub socket.

18. The horizontal axis wind turbine generator of claim 17 further comprising a microprocessor arranged to receive the alignment data, wherein, based on the alignment data, the microprocessor is arranged to control extension and retraction of each wheel or rotary member so that a wheel or rotary member associated with one or more linear actuators engages the back of the hub socket, thereby adjusting the plane of rotation of the hub socket.

19. The horizontal axis wind turbine generator of claim 17, wherein the multiple linear actuators and associated wheels or rotary members limit movement of the hub socket within a desired range of motion and impose limits of the rotation of the hub socket relative to the main shaft axis in order to prevent impact between the hub socket and the face of the nacelle.

20. The horizontal axis wind turbine generator of claim 17, wherein the wheels or rotary members associated with the multiple linear actuators are extended during startup and shut down of the horizontal axis wind turbine generator in order to position the hub socket so as to prevent the plurality of turbine blades from striking the tower or the nacelle.

21. The horizontal axis wind turbine generator of claim 5, further comprising a pitch motor arranged to cause rotation of the coupling base to enable a pitch angle of the turbine blade to be changed.

22. The horizontal axis wind turbine generator of claim 1, wherein the plurality of blade connectors comprises at least three blade connectors, and wherein the plurality of turbine blades comprises at least three turbine blades.

* * * * *